(12) United States Patent
Barrus et al.

(10) Patent No.: US 7,757,162 B2
(45) Date of Patent: Jul. 13, 2010

(54) DOCUMENT COLLECTION MANIPULATION

(75) Inventors: John W. Barrus, Menlo Park, CA (US); Gregory J. Wolff, Palo Alto, CA (US); Kurt Wesley Piersol, Campbell, CA (US); Bradly Rhodes, Palo Alto, CA (US); Stephen R. Savitzky, San Jose, CA (US)

(73) Assignee: Ricoh Co. Ltd., Tokyo (JP)

( * ) Notice: Subject to any disclaimer, the term of this patent is extended or adjusted under 35 U.S.C. 154(b) by 374 days.

(21) Appl. No.: 10/687,019

(22) Filed: Oct. 15, 2003

(65) Prior Publication Data
US 2005/0022122 A1 Jan. 27, 2005

(51) Int. Cl.
*G06F 17/00* (2006.01)
(52) U.S. Cl. ............ 715/230; 715/231; 715/232; 715/233; 715/277
(58) Field of Classification Search .......... 715/530, 715/230, 231, 232, 233, 277
See application file for complete search history.

(56) References Cited

U.S. PATENT DOCUMENTS

| | | | |
|---|---|---|---|
| 4,417,239 A | 11/1983 | Demke et al. | |
| 4,823,303 A | 4/1989 | Terasawa | |
| 4,907,973 A | 3/1990 | Hon et al. | |
| 4,987,447 A | 1/1991 | Ojha | |
| 4,998,215 A | 3/1991 | Black et al. | |
| 5,060,135 A * | 10/1991 | Levine et al. | 715/769 |
| 5,142,579 A | 8/1992 | Anderson | |
| 5,153,831 A | 10/1992 | Yianitos | |
| 5,161,037 A | 11/1992 | Saito | |
| 5,168,371 A | 12/1992 | Takayanagi | |
| 5,191,611 A | 3/1993 | Lang | |
| 5,225,900 A | 7/1993 | Wright | |
| 5,243,381 A | 9/1993 | Hube | |
| 5,247,575 A | 9/1993 | Sprague et al. | |
| 5,255,389 A * | 10/1993 | Wang | 707/10 |
| 5,267,303 A | 11/1993 | Johnson et al. | |
| 5,280,609 A * | 1/1994 | MacPhail | 707/1 |

(Continued)

FOREIGN PATENT DOCUMENTS

CN 1097394 C 12/2002

(Continued)

OTHER PUBLICATIONS

Damiani, E. et al. "A Fine-Grained Access Control System for XML Documents," ACM Transactions on Information and System Security, May 2002, pp. 169-202, vol. 5, No. 2.

(Continued)

*Primary Examiner*—Stephen S Hong
*Assistant Examiner*—Matthew J Ludwig
(74) *Attorney, Agent, or Firm*—Patent Law Works, LLP

(57) ABSTRACT

In a system for inputting and managing document collections, the order in which documents are presented to the system dictates the organization and hierarchy for the electronically stored document collection. Users can add annotations to documents and collections by writing on a coversheet; the system scans the coversheet, reads the written material, and adds the material to the electronically stored document and/or collection. In addition, in one aspect the invention provides a mechanism for granting different levels of access to different individuals, by generating coversheets that point to the same collection but that provide different levels of access to the collection.

26 Claims, 13 Drawing Sheets

U.S. PATENT DOCUMENTS

| | | | |
|---|---|---|---|
| 5,299,123 A * | 3/1994 | Wang et al. ..................... 707/2 |
| 5,309,359 A | 5/1994 | Katz et al. |
| 5,349,658 A | 9/1994 | O'Rourke et al. |
| 5,369,508 A * | 11/1994 | Lech et al. .................. 358/462 |
| 5,384,703 A | 1/1995 | Withgott et al. |
| 5,404,295 A | 4/1995 | Katz et al. |
| 5,418,948 A | 5/1995 | Turtle |
| 5,438,426 A | 8/1995 | Miake et al. |
| 5,442,795 A | 8/1995 | Levine et al. |
| 5,444,476 A | 8/1995 | Conway et al. |
| 5,448,375 A | 9/1995 | Cooper et al. |
| 5,459,307 A * | 10/1995 | Klotz, Jr. ..................... 235/454 |
| 5,468,371 A | 11/1995 | Nelson et al. |
| 5,479,600 A | 12/1995 | Wroblewski et al. |
| 5,481,353 A | 1/1996 | Hicks et al. |
| 5,481,666 A | 1/1996 | Nguyen et al. |
| 5,490,217 A | 2/1996 | Wang et al. |
| 5,499,108 A * | 3/1996 | Cotte et al. .................. 358/400 |
| 5,548,666 A | 8/1996 | Yoneda et al. |
| 5,581,682 A * | 12/1996 | Anderson et al. ........... 715/530 |
| 5,586,238 A | 12/1996 | Murata |
| 5,596,700 A | 1/1997 | Darnell et al. |
| 5,638,543 A | 6/1997 | Pedersen et al. |
| 5,661,799 A | 8/1997 | Nagel et al. |
| 5,666,414 A | 9/1997 | Micali |
| 5,680,223 A * | 10/1997 | Cooper et al. ................ 358/403 |
| 5,680,636 A | 10/1997 | Levine et al. |
| 5,682,330 A | 10/1997 | Seaman et al. |
| 5,682,540 A | 10/1997 | Klotz, Jr. et al. |
| 5,686,957 A | 11/1997 | Baker |
| 5,690,496 A | 11/1997 | Kennedy |
| 5,694,470 A | 12/1997 | Jernbacker |
| 5,694,559 A | 12/1997 | Hobson et al. |
| 5,710,874 A * | 1/1998 | Bergen ....................... 358/1.16 |
| 5,715,381 A * | 2/1998 | Hamilton .................... 358/1.15 |
| 5,717,879 A | 2/1998 | Moran et al. |
| 5,721,897 A | 2/1998 | Rubinstein et al. |
| 5,734,752 A | 3/1998 | Knox |
| 5,734,753 A | 3/1998 | Bunce |
| 5,737,599 A | 4/1998 | Rowe et al. |
| 5,748,805 A | 5/1998 | Withgott et al. |
| 5,751,283 A | 5/1998 | Smith |
| 5,751,287 A | 5/1998 | Hahn et al. |
| 5,754,308 A * | 5/1998 | Lopresti et al. .............. 358/403 |
| 5,754,939 A * | 5/1998 | Herz et al. .................. 455/3.04 |
| 5,760,767 A | 6/1998 | Shore et al. |
| 5,761,655 A | 6/1998 | Hoffman |
| 5,761,686 A | 6/1998 | Bloomberg |
| 5,764,368 A | 6/1998 | Shibaki et al. |
| 5,765,176 A | 6/1998 | Bloomberg |
| 5,774,260 A | 6/1998 | Petitto et al. |
| 5,778,397 A | 7/1998 | Kupiec et al. |
| 5,781,785 A | 7/1998 | Rowe et al. |
| 5,784,616 A | 7/1998 | Horvitz |
| 5,793,365 A | 8/1998 | Tang et al. |
| 5,802,175 A | 9/1998 | Kara |
| 5,802,294 A | 9/1998 | Ludwig et al. |
| 5,812,664 A | 9/1998 | Bernobich et al. |
| 5,819,301 A | 10/1998 | Rowe et al. |
| 5,832,474 A | 11/1998 | Lopresti et al. |
| 5,838,317 A | 11/1998 | Bolnick et al. |
| 5,857,185 A | 1/1999 | Yamamura |
| 5,860,074 A | 1/1999 | Rowe et al. |
| 5,870,552 A * | 2/1999 | Dozier et al. ................. 709/219 |
| 5,870,770 A | 2/1999 | Wolfe |
| 5,873,107 A | 2/1999 | Borovoy et al. |
| 5,892,536 A | 4/1999 | Logan et al. |
| 5,903,538 A | 5/1999 | Fujita et al. |
| 5,903,646 A | 5/1999 | Rackman |
| 5,933,498 A | 8/1999 | Schneck |
| 5,933,829 A | 8/1999 | Durst et al. |
| 5,933,841 A | 8/1999 | Schumacher et al. |
| 5,943,679 A | 8/1999 | Niles et al. |
| 5,946,678 A | 8/1999 | Aalbersberg |
| 5,950,187 A | 9/1999 | Tsuda |
| 5,978,477 A | 11/1999 | Hull et al. |
| 5,982,507 A | 11/1999 | Weiser et al. |
| 5,986,655 A | 11/1999 | Chiu et al. |
| 5,986,692 A | 11/1999 | Logan et al. |
| 5,987,226 A | 11/1999 | Ishikawa et al. |
| 5,987,454 A | 11/1999 | Hobbs |
| 5,990,934 A | 11/1999 | Nalwa |
| 5,999,173 A | 12/1999 | Ubillos |
| 6,006,218 A | 12/1999 | Breese et al. |
| 6,009,177 A | 12/1999 | Sudia |
| 6,009,442 A * | 12/1999 | Chen et al. .................. 715/522 |
| 6,021,403 A | 2/2000 | Horvitz et al. |
| 6,026,409 A | 2/2000 | Blumenthal |
| 6,028,601 A | 2/2000 | Machiraju et al. |
| 6,055,542 A | 4/2000 | Nielsen et al. |
| 6,094,648 A | 7/2000 | Aalbersberg et al. |
| RE36,801 E | 8/2000 | Logan et al. |
| 6,101,503 A | 8/2000 | Cooper et al. |
| 6,106,457 A | 8/2000 | Perkins et al. |
| 6,182,090 B1 | 1/2001 | Peairs |
| 6,262,724 B1 | 7/2001 | Crow et al. |
| 6,298,145 B1 | 10/2001 | Zhang et al. |
| 6,301,586 B1 | 10/2001 | Yang et al. |
| 6,301,660 B1 | 10/2001 | Benson |
| 6,332,147 B1 | 12/2001 | Moran et al. |
| 6,339,825 B2 | 1/2002 | Pensak et al. |
| 6,369,811 B1 | 4/2002 | Graham et al. |
| 6,373,585 B1 | 4/2002 | Mastie et al. |
| 6,408,330 B1 | 6/2002 | DeLaHuerga |
| 6,409,401 B1 | 6/2002 | Petteruti et al. |
| 6,466,329 B1 | 10/2002 | Mukai |
| 6,519,360 B1 | 2/2003 | Tanaka |
| 6,529,920 B1 | 3/2003 | Arons et al. |
| 6,535,298 B2 | 3/2003 | Winter et al. |
| 6,545,687 B2 | 4/2003 | Scott et al. |
| 6,611,628 B1 | 8/2003 | Sekiguchi et al. |
| 6,657,702 B1 | 12/2003 | Chui et al. |
| 6,674,923 B1 | 1/2004 | Shih et al. |
| 6,687,383 B1 | 2/2004 | Kanevsky et al. |
| 6,714,216 B2 | 3/2004 | Abe |
| 6,724,494 B1 | 4/2004 | Danknick |
| 6,735,324 B1 | 5/2004 | McKinley et al. |
| 6,751,732 B2 | 6/2004 | Strobel et al. |
| 6,752,317 B2 | 6/2004 | Dymetman et al. |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,892,193 B2 | 5/2005 | Bolle et al. |
| 6,947,557 B1 | 9/2005 | Megiddo |
| 7,002,700 B1 | 2/2006 | Motamed |
| 7,031,965 B1 | 4/2006 | Moriya et al. |
| 7,131,058 B1 | 10/2006 | Lapstun |
| 7,131,061 B2 * | 10/2006 | MacLean et al. ............. 715/210 |
| 7,165,268 B1 * | 1/2007 | Moore et al. .................... 726/2 |
| 7,263,671 B2 | 8/2007 | Hull et al. |
| 7,313,340 B2 * | 12/2007 | Savitzky et al. ................ 399/84 |
| 2001/0037408 A1 | 11/2001 | Thrift et al. |
| 2002/0004807 A1 | 1/2002 | Graham et al. |
| 2002/0006100 A1 | 1/2002 | Cundiff, Sr. et al. |
| 2002/0016819 A1 | 2/2002 | Sugimoto et al. |
| 2002/0049614 A1 | 4/2002 | Rice et al. |
| 2002/0085759 A1* | 7/2002 | Davies et al. ................ 382/203 |
| 2002/0097426 A1 | 7/2002 | Gusmano et al. |
| 2002/0131065 A1 | 9/2002 | Sweetland et al. |
| 2002/0159637 A1 | 10/2002 | Echigo et al. |
| 2002/0163653 A1 | 11/2002 | Struble et al. |
| 2002/0171857 A1 | 11/2002 | Hisatomi et al. |
| 2002/0199149 A1 | 12/2002 | Nagasaki et al. |
| 2003/0051214 A1 | 3/2003 | Graham et al. |

| | | | |
|---|---|---|---|
| 2003/0084462 A1 | 5/2003 | Kubota et al. | |
| 2003/0088582 A1 | 5/2003 | Pflug | |
| 2003/0117652 A1 | 6/2003 | Lapstun | |
| 2003/0130952 A1* | 7/2003 | Bell et al. | 705/51 |
| 2003/0137545 A1 | 7/2003 | Hoehn et al. | |
| 2003/0160898 A1 | 8/2003 | Back et al. | |
| 2003/0163552 A1 | 8/2003 | Savitzky et al. | |
| 2003/0184598 A1 | 10/2003 | Graham | |
| 2003/0212749 A1 | 11/2003 | Jenkins et al. | |
| 2004/0090462 A1 | 5/2004 | Graham | |
| 2004/0128613 A1 | 7/2004 | Sinisi | |
| 2004/0193571 A1 | 9/2004 | Barrus et al. | |
| 2004/0194026 A1 | 9/2004 | Barrus et al. | |
| 2004/0240541 A1 | 12/2004 | Chadwick et al. | |
| 2005/0022122 A1 | 1/2005 | Barrus et al. | |
| 2006/0136450 A1* | 6/2006 | Barrus et al. | 707/101 |
| 2006/0190544 A1 | 8/2006 | Chikirivao et al. | |
| 2006/0242567 A1 | 10/2006 | Rowson et al. | |
| 2006/0262995 A1 | 11/2006 | Barrus et al. | |
| 2006/0288236 A1 | 12/2006 | McCue | |
| 2007/0050696 A1* | 3/2007 | Piersol et al. | 715/500 |
| 2009/0254972 A1* | 10/2009 | Huang et al. | 726/1 |

FOREIGN PATENT DOCUMENTS

| | | |
|---|---|---|
| EP | 378 848 A2 | 7/1990 |
| EP | 459 174 A2 | 12/1991 |
| EP | 459 174 B1 | 12/1991 |
| EP | 737 927 A2 | 10/1996 |
| EP | 762 297 A2 | 3/1997 |
| EP | 802 492 A1 | 10/1997 |
| EP | 0864959 A2 | 9/1998 |
| EP | 1 001 605 A3 | 5/2000 |
| EP | 1133170 A2 | 9/2001 |
| GB | 2 137 788 A | 10/1984 |
| GB | 2 156 118 A | 10/1985 |
| GB | 2 234 609 A | 2/1991 |
| GB | 2 290 898 A | 1/1996 |
| GB | 2290878 A | 1/1996 |
| JP | 8-297677 A | 11/1996 |
| JP | 09-091301 A | 4/1997 |
| JP | 11-143908 A | 5/1999 |
| JP | 2000-295557 | 10/2000 |
| JP | 2001-005805 A | 1/2001 |
| JP | 2003-085015 A | 2/2003 |
| JP | 2006-261717 A | 9/2006 |
| WO | WO 99/18523 | 4/1999 |
| WO | WO 99/18523 A1 | 4/1999 |
| WO | WO 99/38099 A1 | 7/1999 |
| WO | WO 02/098670 A2 | 12/2002 |

OTHER PUBLICATIONS

Grasso, A. et al., "Augmenting Recommender Systems by Embedding Interfaces Into Practices," Proceedings of the 33$^{rd}$ Hawaii International Conference on System Sciences 2000 IEEE, pp. 1-9.

Hoadley, C., "A Very Short Introduction to UNIX," The Metropolitan State College of Denver/Information Technology Center for Technology Services, Apr. 30, 2002, pp. 1-18.

Khare, R., "Anatomy Of A URL (and Other Internet-Scale Namespaces, Part 1)," IEEE Internet Computing, Sep.-Oct. 1999, pp. 78-81.

Shen, H. et al. "Access Control for Collaborative Environments," CSCW 92 Proceedings, Nov. 1992, pp. 51-58.

Sloman, M., "Policy Driven Management for Distributed Systems," To be published in Journal of Network and Systems Management, Plenum Press, 1994, vol. 2, No. 4.

"Flowport, Paper that knows where it's going," specification sheet, 2 pages total.

<http://www.zdnet.com.au/printfriendly?AT=2000023555-20270277-4>, "Captured! Three document capture systems tested, Nov. 28, 2002," visited on Apr. 29, 2003, 9 pages total.

Lutz, Raymond, "BrowseFax Initiative," MPFA Information Site, downloaded from internet, http://www.mtpa.org/pub/browsefax_wp.htm on May 14, 2004.

Xerox FlowPort Software, Solutions for the Legal Market from Xerox, 2001 Xerox Corporation, 4 pages total.

Abdel-Mottaleb, M. et al., "Face Detection in Complex Environments From Color Images," IEEE ICIP 622-626, 1999.

Arons, B. "SpeechSkimmer: A System for Interactively Skimming Recorded Speech," ACM Transactions on Computer-Human Interaction 4(1):3-38.

Begole et al., "Supporting Worker Independence in Collaboration Transparency," ACM 0-58113-034-1/98/11, Virginia Polytechnic Institute and State University, pp. 133-142, 1998.

Boguraev et al., "Salience/based Content Characterization of Text Documents," in Proceedings of Workshop on Intelligent Scalable Text Summarization at the ACL/EACL Conference, Madrid, Spain, 12 pages, Jul. 7-12, 1997.

Divakaran, A. et al., "Video Browsing System Based on Compressed Domain Feature Extraction," IEEE Transactions on Consumer Electronics 46:637-644.

Doermann et al., "Applying Algebraic and Differential Invariants for Logo Recognition," Machine Vision and Applications 9:73-86, 1996.

Dorai, C. et al., "Perceived Visual Motion Descriptors from MPEG-2 for content-based HDTV annotation and retrieval," IEEE 3$^{rd}$ Workshop on Multimedia Signal Processing, 147-152.

Erol, B. et al., "Local Motion Descriptors," IEEE Workshop on Multimedia Signal Processing, 467-472, 2001.

Foote, J. et al., "Finding Presentations in Recorded Meeting Using Audio and Video Features." ICASPP, 3029-3032, 1999.

Foote, J. et al., "FlyCam: Practical Panoramic Video and Automatic Camera Control," Proceedings of International Conference on Multimedia & Expo, 3:1419-1422, 2000.

Glance, Natalie et al., "Knowledge Pump: Community-Centered Collaborative Filtering," Xerox Research Centre Europe, Grenoble Laboratory, Oct. 27, 1997, pp. 1-5.

Grasso, Antonietta et al., "Supporting Informal Communication Across Local and Distributed Communities," Xerox Research Centre Europe, Grenoble, France, 8 pages.

Greenberg, S., "A Fisheye Text Editor for Relaxed-WYSIWIS Groupware," ACM SIGCHI'96 Conference on Human Factors in Computing System, Companion Proceedings, 1996, 5 pages.

Gross, R. et al., "Face Recognition in a Meeting Room," IEEE International Conference on Automatic Face and Gesture Recognition, 294-299.

Gross, R. et al., "Towards a Multimodal Meeting Record," Proceedings of International Conference on Multimedia and Expo, 1593-1596.

Hsu, R.L., et al., "Face Detection in Color Images," Proc. International Conference on Image Processing, 1046-1049, 2001.

Johnson, S.E., "Who Spoke When?—Automatic Segmentation and Clustering for Determining Speaker Turns," Proc. Of Eurospeech, 679-682, 1999.

Kapralos, B. et al., "Eyes 'n Ears Face Detection," 2001 International Conference on Image Processing, 1:65-69, 2001.

Kimber, D. et al., "Acoustic Segmentation for Audio Browsers," Proc. Interface Conference, Sydney, Australia, 10 pages, 1996.

Lee, D. et al., "Segmenting People in Meeting Videos Using Mixture Background and Object Models," Proc. Of Pacific Rim Conference on Multimedia, Taiwan, Dec. 16-18, 8 pages, 2002.

Li et al., "Text Extraction, Enhancement and OCR in Digital Video," DAS '98, LNCS 1655, pp. 363-377, Springer-Verlag Berlin Heidelberg 1999.

Pfau, T. et al., "Multispeaker Speech Activity Detection for the ICSI Meeting Recorder," Proc. IEEE Automatic Speech Recognition and Understanding Workshop, 4 Pages, 2001.

Pingali, G. et al., "Multimedia Retrieval Through Spatio-Temporal Activity Maps," ACM Multimedia 129-136, 2001.

Rui, Y. et al., "Viewing Meetings Captured by an Omni-Directional Camera," ACM SIGCHI '01, vol. 3, No. 1, pp. 450-457, Seattle, Mar. 31-Apr. 4, 2001.

Snowdon, Dave et al., "Diffusing Information in Organizational Settings: Learning from Experience," CHI 2002, vol. No. 4, Issue No. 1, Apr. 20-25, Minneapolis, Minnesota, pp. 331-338.

Stauffer, C. et al., "Adaptive Background Mixture Models for Real-Time Tracking," Proceedings of Computer Vision and Pattern Recognition, 246-252.

Sun, X. et al., "A Motion Activity Descriptor and its Extraction in Compressed Domain," Proc. IEEE Pacific-Rim Conference on Multimedia (PCM '01), 4 pages, 2001.

Sun, X. et al., "Panoramic Video Capturing and Compressed Domain Virtual Camera Control," ACM Multimedia, pp. 329-338, 2001.

Taghva et al., "Evaluation of an Automatic Markup System," Proceedings SPIE vol. 2422, Document Recognition II, p. 317-327, Mar. 1995.

Tritschler, A. et al., "Improved Speaker Segmentation and Segments Clustering Using the Bayesian Information Criterion," Proc. Of Eurospeech, pp. 679-682, 1999.

Waibel, A. et al., "Advances in Automatic Meeting Record Creation and Access," Proceedings of the International Conference on Acoustics, Speech, and Signal Processing, pp. 597-600, 2001.

Xerox, "Flowport, Effective Document Management," brochure, 2 pages.

Xerox, "Flowport, Paper that knows where it's going," Xerox Corporation, specification sheet, 1 page.

Xerox, "FlowPort Software, Solutions for the Legal Market from Xerox," 2001 Xerox Corporation, 2 pages.

Xerox, "FlowPort™ Xerox Image Routing Software FlowPort Overview," Xerox Corporation, 2003, 4 pages.

Yang, J. et al., "Multimodal People ID for a Multimedia Meeting Browser," Proceedings of ACM Multimedia, pp. 159-168, 1999.

Yang, M.H. et al., "Detecting Faces in Image: A Survey," IEEE Transactions on Pattern Analysis and Machine Intelligence, 24(1):34-58, 2002.

ZDnet, "Captured! Three document capture systems tested," ZDnet, Technology & Business, Nov. 28, 2002, [visited on Apr. 29, 2003], <http://www.zdnet.com.au/printfriendly?AT=2000023555-20270277-4>, 8 pages.

Acrobat Reader Version 2.0 (software application), Adobe Systems Incorporated, screenshots Figures 1-10 (1994).

Adobe Acrobat Reader 3.0 screen dumps (fig. 1-3), 1996.

Adobe Premiere (video editing software) from http://www.adobe.com (2002).

Adobe Systems, Inc., "Adobe Photoshop 4.0 User Guide for Macintosh and Windows," 1996, Title Page, Copyright Page, Chap. 2, pp. 30-31.

Apple Macintosh system 7 reference manual, pp. 30-31 (1991).

Ball, Thomas et al., "Software Visualization in the Large," IEEE Computer, vol. 29, No. 4, Apr. 1996, pp. 33-43, http://www.computer.org/computer/co1996/r4033abs.htm.

Begole et al., "Flexible Collaboration Transparency," doc. ID: ncstri.vatech_cs/TR-98-11, Virginia Polytechnic Institute and State University, 1998.

Begole et al. "Flexible Collaboration Transparency: Supporting Worker Independence In Replicated Application-Sharing Systems," ACM Transactions on Computer-Human Interaction, Jun. 1999, pp. 95-132, vol. 6, No. 2.

Begole et al., "Supporting Worker Independence In Collaboration Transparency," technical report from the Computer Science Department of Virginia Tech, doc. ID: ncstrl.vatech_cs/TR-98-12.

Bobick et al., "A State Based Approach to the Representation and Recognition of Gesture," IEEE Trans. On Pattern Analysis and Machine Intelligence, pp. 1325-1337, 1997.

Boguraev et al., "Salience-Based Content Characterization Of Text Documents," ACL/EACL'97 Intelligent Scalable Text Summarization Workshop Program, Jul. 11, 1997, 14 pages.

Boreczky, J. et al., "An Interactive Comic Book Presentation for Exploring Video," Conference on Human Factors in Computing Systems (CHI 2000), ACM Press, pp. 185-192, 2000.

Boykin et al., "Improving Broadcast News Segmentation Processing," IEEE Multimedia '99, 1999.

Boykin et al., "Machine Learning of Event Segmentation for News on Demand," Communications of the ACM, 43:35-41, 2000.

Brandow et al., "Automatic Condensation of Electronic Publications by Sentence Selection," Information Processing and Management, 31(5):875-685, 1995.

Brown et al., "Automatic Content-Based Retrieval of Broadcast News," ACM Multimedia 5, San Francisco, CA, 1995.

Byrd, D., "A Scrollbar-based visualization for Document Navigation," doc. ID:xxx.cs.IR/9902028, Computing Research Repository: Information Retrieval, 1999.

"c:\ . . . \9149920c.wpd—unmodified" Screen Shots of document created in Corel WordPerfect, 4 pages (Apr. 30, 2002).

Chen et al., "Emotion Recognition from Audiovisual Information," Proc. IEEE Workshop on Multimedia Signal Processing, Los Angeles, CA, USA, pp. 83-88, 1998.

Chen et al., "ViBE: A Video Indexing and Browsing Environment," Proceedings of the SPIE Conference on Multimedia Storage and Archiving Systems, Sep. 20-22, 1999, Boston 3846:148-164, 1999.

Chiu et al., "NoteLook: Taking Notes in Meetings with Digital Video and Ink," ACM Multimedia 99 Orlando, 1999.

Chiu et al., "Automatically Linking Multimedia Meeting Documents by Image Matching," Proceedings of Hypertext '00, ACM, New York, pp. 244-245, 2000.

Christel et al., "Evolving Video Skims into Useful Multimedia Abstractions," Proceedings of the CHI '98 Conference on Human Factors in Computing Systems, pp. 171-178 Los Angeles, CA, Apr. 1998.

Christel et al., "Information Visualization Within a Digital Video Library," Journal of Intelligent Information Systems, 11:35-257, 1998.

Dellaert et al., "Recognizing Emotion in Speech," Proceedings ICSLP 96, Fourth International Conference on Spoken Language Processing New York, IEEE vol. 1970-1973, Cat. No. 96TH8206), 1996.

Dimitrova et al., "Video Keyframe Extraction and Filtering: A Keyframe is not a Keyframe to Everyone," CIKM 1997:113-120, 1997.

Donato et al., "Classifying Facial Actions," IEEE Trans. on Pattern Analysis and Machine Intelligence, 21:974-989, 1999.

Drucker et al., "SmartSkip: Consumer Level Browsing and Skipping of Digital Video Content," Paper: Technology to Help People Find Information, vol. No. 4, Issue No. 1, pp. 219-226, Minneapolis, Minnesota, USA, Apr. 20-25, 2002.

Essa et al., "Coding Analysis Interpretation and Recognition of Facial Expressions," IEEE Trans. on Pattern Analysis and Machine Intelligence, 19:757-763, 1997.

"Facelt Face Recognition Technology Frequently Asked Technical Questions," Visionics Corporation, 36 pages.

"Flexible JAMM Screenshots," downloaded from internet site http://simon.cs.ct.edu/-jamm May 4, 2000.

Foote, J. et al., "An Intelligent Media Browser Using Automatic Multimodal Analysis," ACM Multimedia '98, ACM Press, pp. 375-380, Bristol, UK, 1998.

Furui et al., "Japanese Broadcast News Transaction and Information Extraction," Communications of the ACM, 43(2):71-73, Feb. 2000.

Gauvain et al., "Transcribing Broadcast News for Audio and Video Indexing," Communications of the ACM, 43:64-70, 2000.

Gibbon, David C., "Generating Hypermedia Documents from Transcriptions of Television Programs Using Parallel Text Alignment," Handbook of Internet and Multimedia Systems and Applications, CRC Press, 1998.

Gliedman, J., "Virtual Office Managers," Computer Shopper, 18(9):290,1998.

Gordon, "Using Annotated Video as in Information Retrieval Interface," ACM Proceedings of the 5th International Conference on Intelligent User Interfaces, New Orleans, pp. 133-140, 2000.

Greenberg, Saul, "A Fisheye Text Editor for Relaxed-WYSIWIS Groupware," ACM SIGCHI'96 Conference on Human Factors in Computing System, Companion Proceedings, 1996, pp. 212-213.

Greenberg, et al., "Sharing Fisheye Views in Relaxed-WYSIWIS Groupware Applications," Proceedings of Graphics Interface, Toronto, Canada, May 22-24, 1995, Distributed by Morgan-Kaufmann, pp. 28-38, http://www.cpsu.ucalgary.ca/grouplab/papers/1996/96-Fisheye.GI/gi96fisheye.html.

Hauptmann et al., "Story Segmentation and Detection of Commercials in Broadcast News Video," Advances in Digital Libraries Conference, Santa Barbara, CA Apr. 22-23, 1998.

Hauptmann et al., "Text, Speech and Vision for Video Segmentation: the Informedia Project," Proc. AAAI Fall Symp. Computational Models for Integrating Language and Vision, Boston, MA, Nov. 10-12, 1995.

He et al., "Comparing Presentation Summaries: Slides vs. Reading vs. Listening," Conference on Human Factors in Computing Systems (CHI 2000), Apr. 1-6, 2000.

Hearst et al., "TileBars: Visualization of Term Distribution Information in Full Text Information Access," Proceedings of the ACM SIGCHI Conference on Human Factors in Computing Systems (CHI), Denver, CO., pp. 1-8, May 1995, http://www.acm.org/sigchi/chi95/Electronic/documents/papers/mah_bdy.htm.

Hecht, "Embedded Data Glyph Technology for Hardcopy Digital Documents," Proc. SPIE 2171:341-352, 1994.

Hecht, "Printed Embedded Data Graphical User Interfaces," IEEE Computer, Mar. 2001.

Hill et al., "Edit Wear and Read Wear," Computer Graphics and Interactive Media Research Group, pp. 3-9, May 1992.

Hu et al., "Multimedia Description Framework (MDF) for Content Descriptions of Audio/Video Documents," Fourth ACM Conference on Digital Libraries (DL '99), Aug. 11-14, 1999.

IBM Technical Disclosure Bulletin, "Quick Selection of Window Environment Coordinates," 35:57-60, ISS # 4B, 1992.

Ioffe et al., "Finding People by Sampling," Proc. International Conference on Computer Vision, pp. 1092-1097, 1999.

Jang et al., "Improving Acoustic Models With Captioned Multimedia Speech," IEEE, 1999, pp. 767-771.

Jin et al., "Topic Tracking for Radio, TV Broadcast, and Newswire," Proceedings of the DARPA Broadcast News Workshop, Feb. 28-Mar. 3, 1999, Hemdon, VA.

Komlodi et al., "Key Frame Preview Techniques for Video Browsing," Proceedings of the $3^{rd}$ ACM International Conference on Digital Libraries, Jun. 23-26, 1998, Pittsburgh, pp. 118-125, 1998.

Lam et al., "Automatic Document Classification Based on Probabilistic Reasoning: Model and Performance Analysis," IEEE, 3:2719-2723, 1997.

Langley, P., "An Analysis of Bayesian Classifiers," Proceedings of $10^{th}$ National Conference on Artificial Intelligence, pp. 223-228, 1992.

Langley, P., "Induction of Selective Bayesian Classifiers," Proceedings of $10^{th}$ National Conference on Uncertainty in Artificial Intelligence, pp. 400-406, 1994.

Li et al., "Automatic Text Detection and Tracking in Digital Video," IEEE Transactions on Image Processing—Special Issue on Image and Video Processing for Digital Libraries, 9:147-156, 2000.

Li et al., "Text Extraction and Recognition in Digital Video," Proceedings of Third IAPR Workshop on Document Analysis Systems, pp. 119-128, 1998.

Li et al., "Vision: A Digital Video Library," Proceedings of the $1^{st}$ ACM International Conference on Digital Libraries, pp. 19-27, 1996.

Liang et al., "Practical Video Indexing and Retrieval System," SPIE 3240:294-303, 1988.

Lienhart et al., "On the Detection and Recognition of Television Commercials," Proc. IEEE Conf. On Multimedia Computing and Systems, Ottawa, Canada, pp. 509-516, Jun. 1997.

Ma et al., "An Indexing and Browsing System for Home Video," Invited paper, EUSIPCO '2000, $10^{th}$ European Signal Processing Conference, Sep. 5-8, 2000, Tampere, Finland.

Manber, U., "The Use of Customized Emphasis in Text Visualization," Proceedings of 1997 IEEE Conf. On Information Visualization, pp. 132-138, Aug. 27-29, 1997, London, England.

Maybury, "News on Demand," Communications of the ACM, 43:33-34, 2000.

Maybury et al., "Multimedia Summaries of Broadcast News," International Conference on Intelligent Information Systems, 1997, pp. 442-449.

Maybury, M. et al., "Segmentation, Content Extraction and Visualization of Broadcast News Video Using Multistream Analysis," AAAI Paper, 1997.

Merialdo et al., "Automatic Construction of Personalized TV News Programs," Seventh ACM International Multimedia Conference, Orlando, Nov. 1999.

Merlino et al., "Broadcast News Navigation Using Story Segmentation," Advanced Information Systems Center, The MITRE Corporation, 1997.

Merlino et al., "Broadcast News Processing Techniques," MITRE Technical Report, MTR 99B0000031, Apr. 1999.

Mohan, "Text-Based Search of TV News Stories," Proc. SPIE 2916:2-13, 1996.

Myers, B.A. et al., "Multi-View Intelligent Editor for Digital Video Libraries," First ACM and IEEE Joint Conference on Digital Libraries, pp. 106-115, Jun. 24-28, 2001, Roanoke, VA.

Oh et al., "Efficient and Cost-Effective Techniques for Browsing and Indexing Large Video Databases," SIGMOD Conference 2000:415-426.

Rist, T. et al., "Adding Animated Presentation Agents to the Interface," ACM International Conference on Intelligent User Interfaces, pp. 79-86, 1997.

Rowley et al., "Neural Network-Based Face Detection," IEEE Transactions on Pattern Analysis and Machine Intelligence, 20:23-38, 1998.

Schweighofer et al., "The Automatic Generation of Hypertext Links in Legal Documents," Lecture Notes in Computer Science, vol. 1134, Wagner et al., eds., from $7^{th}$ Int. Conf., DEXA '96, Sep. 1996, Zurich, Switzerland.

Shahraray et al., "Automatic Generation of Pictorial Transcripts of Video Programs," Proceedings of the SPIE—Int. Soc. Opt. Eng. 2417:512-518, 1995.

Shahraray et al., "Pictorial Transcripts: Multimedia Processing Applied to Digital Library Creation," 1997 IEEE First Workshop on Multimedia Signal Processing, pp. 581-586, 1997.

Shahraray et al., "Automated Authoring of Hypermedia Documents of Video Programs," ACM Multimedia 95, San Francisco, CA, Nov. 5-9, 1995.

Smith et al., "Video Skimming and Characterization Through the Combination of Image and Language Understanding," Computer Vision and Pattern Recognition IEEE 1997.

Sodergard et al., "Integrated Multimedia Publishing—Combining TV and Newspaper Content on Personal Channels," downloaded from http:www8.org/w8-papers/1b-multimedia/integrated/integrated.html on Apr. 4, 2002, pp. 1-22.

Sonmez et al., "Multiple Speaker Tracking and Detection: Handset Normalization and Duration Scoring," Digital Signal Processing 10:133-143, 2000.

Suda et al., "Logo and Word Matching Using a General Approach to Signal Registration," Fourth International Conference on Document Analysis and Recognition, Ulm, Germany, Aug. 18-20, 1997, 61-65.

Sumita et al., "Document Structure Extraction for Interactive Document Retrieval Systems," Proceedings of SIGDOC 93, pp. 301-310, Oct. 5-8, 1993, Kitchner, Ontario.

Taghva et al., "An Evaluation Of An Automatic Markup System," SPIE Proceedings, Feb. 6-7, 1995, pp. 317-327, vol. 2422.

Taxt, T., "Segmentation of Document Images," IEEE, 11(12):1322-1329 (1989).

Tennenhouse et al., "A Software-Oriented Approach to the Design of Media Processing Environments," Proceedings of the IEEE International Conference on Multimedia Computing and Systems, pp. 435-444, 1994.

Tonomura et al., "VideoMAP and VideoSpaceIcon: Tools for Anatomizing Video Content," Proc. INTERCHI '93, ACM, pp. 131-136, 1993.

Uchihashi et al., "Summarizing Video Using a Shot Importance Measure and a Frame-Packing Algorithm," Proceedings of the International Conference on Acoustics, Speech, and Signal Processing, Phoenix, AZ, 6:3041-3044, 1999.

Uchihashi et al., "Video Manga: Generating Semantically Meaningful Video Summaries," ACM Multimedia 99, Orlando, Florida, Oct. 30-Nov. 5, 1989.

VideoLogger, Automate Video Acquisition And Production, Virage, Inc., [online] [Retrieved on Apr. 26, 2002] Retrieved from the Internet<URL:http://www.virage.com/products/details.cfm?productID=5&categoryID=1>.

"Video Mail Retrieval Using Voice" Cambridge University Engineering Department Computer Laboratory and Olivetti Research Laboratory summary of research found at http://svr-www.eng.cam.ac.uk/research/projects/vmr/ (1997).

Wactlar et al., "Complementary Video and Audio Analysis for Broadcast News Archives," Communications of the ACM, 43:42-47, 2000.

Wactlar et al., "Intelligent Access to Digital Video: Informedia Project," Computer 29:46-52, 1996.

Weiss et al., "Composition and Search with a Video Algebra," IEEE Multimedia 2:12-25, 1995.

Wilcox, L. et al., "Annotation and Segmentation for Multimedia Indexing and Retrieval," Proceedings of the Thirty-First annual Hawaii International Conference on System Sciences (Wailea, Hawaii), vol. II, pp. 259-267, Jan. 1998.

Wittenburg et al., Browsing with Dynamic Key Frame Collages in Web-Based Entertainment Video Services, In Proceedings of IEEE International Conference on Multimedia Computing and Systems, Jun. 7-11, 1999, Florence, Italy, 2:913-918, 1999.

Zhang et al., "Detection of Text Captions in Compressed Domain Video," International Multimedia Conference Proceedings of the 2000 ACM Workshops on Multimedia 2000, Los Angeles, CA, pp. 201-204.

Meyers et al., "Facsimile with Encrypted Hard Copy," IBM Technical Disclosure Bulletin, TDB 04-78, Apr. 1, 1978, pp. 4994-4995, [online] [Retrieved on Apr. 7, 2006] Retrieved from the Internet<URL:http://www.ip.com/pubview/IPCOM000069447D>.

Office Action from Chinese Application No. 200410102384.4, Nov. 10, 2006, 13 pages.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.

European Search Report, EP 04255837, Sep. 5, 2006, 3 pages.

European Search Report, EP 04255839, Sep. 4, 2006, 3 pages.

European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books with Voices: Paper Transcripts as a Tangible Interface to Oral Histories," CHI Letters, Apr. 5-10, 2003, pp. 89-96, vol. 5, Issue 1.

Lamming et al., "Using Automatically Generated Descriptions of Human Activity to Index Multi-Media Data," IEEE Multimedia Communications and Applications IEEE Colloquium, Feb. 7, 1991, pp. 5/1-5/3.

"Microsoft Powerpoint—Wikipedia, the free encyclopedia," Wikipedia Foundation, inc. [online] [Retrieved on Nov. 7, 2006] Retrieved from the Internet<URL:http://en.wikipedia.org/wiki/Microsoft_PowerPoint>.

Minami, K. et al., "Video Handling with Music and Speech Detection," IEEE Multimedia, Jul.-Sep. 1998, pp. 17-25.

Meyers et al., Facsimile with Encrypted Hard Copy, IBM Technical Disclosure Bulletin, TDB 04-78, pp. 4994-4995, Apr. 7, 1978, downloaded from: www.ip.com/pubview/PCOM000069447D, cover page and pp. 1 and 2.

Non-Final Office Action for U.S. Appl. No. 10/404,927, mailed on Apr. 10, 2006, 39 pages.

Non-Final Office Action for U.S. Appl. No. 10/404,927, mailed on Nov. 14, 2006, 48 pages.

Final Office Action for U.S. Appl. No. 10/404,927, mailed Jul. 16, 2007, 36 pages.

Non-Final Office Action for U.S. Appl. No. 10/404,927, mailed Jan. 25, 2008, 32 pages.

Final Office Action for U.S. Appl. No. 10/404,927, mailed Oct. 17, 2008, 35 pages.

Non-Final Office Action for U.S. Appl. No. 10/404,927, mailed on Apr. 2, 2009, 37 pages.

Non-Final Office for U.S. Appl. No. 10/404,916. mailed Mar. 31, 2006, 30 pages.

Final Office Action for U.S. Appl. No. 10/404,916, mailed Dec. 22, 2006, 47 pages.

Non-Final Office Action for U.S. Appl. No. 10/404,916, mailed Jul. 16, 2007.

Final Office Action for U.S. Appl. No. 10/404,916, mailed Jan. 23, 2009, 23 pages.

Advisory Action for U.S. Appl. No. 10/404,916, mailed Mar. 24, 2009, 5 pages.

Notice of Allowance for U.S. Appl. No. 10/404,916, mailed on Aug. 17, 2009, 9 pages.

Non-Final Office Action for U.S. Appl. No. 10/665,097, mailed Apr. 12, 2006, 48 pages.

Final Office Action for U.S. Appl. No. 10/665,097,mailed Oct. 5, 2006, 32 pages.

Non-Final Office Action for U.S. Appl. No. 10/665,097, mailed Mar. 21, 2007, 30 pages.

Final Office Action for U.S. Appl. No. 10/665,097,mailed Sep. 18, 2007, 30 pages.

Non-Final Office Action for U.S. Appl. No. 10/665,097, mailed Jan. 25, 2008, 31 pages.

Final Office Action for U.S. Appl. No. 10/665,097,mailed Jul. 24, 2008, 30 pages.

Notice of Allowance for U.S. Appl. No. 10/665,097, mailed Feb. 25, 2009, 13 pages.

Non-Final Office Action for U.S. Appl. No. 10/894,653, mailed Apr. 14, 2006, 49 pages.

Non-Final Office Action for U.S. Appl. No. 10/894,653, mailed Jan. 25, 2007, 27 pages.

Final Office Action for U.S. Appl. No. 10/894,653,mailed Jul. 16, 2007 15 pages.

Non-Final Office Action for U.S. Appl. No. 10/894,653, mailed Dec. 28, 2007, 19 pages.

Final Office Action for U.S. Appl. No. 10/894,653,mailed Aug. 8, 2008, 17 pages.

Notice of Allowance for U.S. Appl. No. 10/894,653,mailed Dec. 31, 2008, 17 pages.

Non-Final Office Action for U.S. Appl. No. 10/639,282, mailed Apr. 12, 2006, 55 pages.

Final Office Action for U.S. Appl. No. 10/639,282,mailed Oct. 5, 2006, 40 pages.

Non-Final Office Action for U.S. Appl. No. 10/639,282, mailed Oct. 25, 2007, 42 pages.

Final Office Action for U.S. Appl. No. 10/639,282,mailed Apr. 17, 2008, 39 pages.

Final Office Action for U.S. Appl. No. 10/639,282,mailed Nov. 17, 2008, 35 pages.

Final Office Action for U.S. Appl. No. 10/639,282,mailed May 14, 2009, 37 pages.

* cited by examiner

DOCUMENT COLLECTION MANIPULATION

CROSS-REFERENCE TO RELATED APPLICATIONS

This application is related to the following commonly owned and co-pending U.S. patent applications, the disclosures of which are incorporated by reference:

U.S. patent application Ser. No. 09/533,252 titled "Method and System for Information Management to Facilitate the Exchange of Ideas During a Collaborative Effort," filed Mar. 8, 2000, now U.S. Pat. No. 6,253,577, issued on Jul. 3, 2001;

Pending U.S. patent application Ser. No. 10/001,895 titled "Paper-Based Interface For Multimedia Information," filed Nov. 19, 2001;

Pending U.S. patent application Ser. No. 10/081,129 titled "Multimedia Visualization & Integration Environment," filed Feb. 21, 2002;

Pending U.S. patent application Ser. No. 10/085,569 titled "A Document Distribution and Storage System," filed Feb. 26, 2002;

Pending U.S. patent application Ser. No. 10/174,522 titled "Television-based Visualization and Navigation Interface," filed Jun. 17, 2002;

Pending U.S. patent application Ser. No. 10/175,540 titled "Device For Generating A Multimedia Paper Document," filed Jun. 18, 2002;

Pending U.S. patent application Ser. No. 10/307,235 titled "Multimodal Access of Meeting Recordings," filed Nov. 29, 2002;

Pending U.S. patent application Ser. No. 10/404,916 titled "Method and Apparatus for Composing Multimedia Documents," filed Mar. 31, 2003;

Pending U.S. patent application Ser. No. 10/404,927 titled "Multimedia Document Sharing Method and Apparatus," filed Mar. 31, 2003;

Pending U.S. patent application Ser. No. 10/639,282 titled "Physical Key for Accessing a Securely Stored Digital Document," filed Aug. 11, 2003; and Pending U.S. patent application Ser. No. 10/665,097 titled "Action Stickers For Identifying And Processing Stored Documents," filed Sep. 16, 2003.

BACKGROUND OF THE INVENTION

1. Field of the Invention

The present invention relates generally to document management, and more specifically to mechanisms for accessing, manipulating, and disseminating collections of documents.

2. Background of the Invention

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. The computer promotes individual expression through the use of graphics tools, image capture devices, image enhancement tools, and so on, in addition to traditional text editing. Oftentimes, documents must be shared among colleagues, thus generating even more paper.

Despite advances in technology, practical substitutes for paper remain to be developed. Computer displays, PDAs (personal digital assistants), wireless devices, and the like all have their various advantages, but they lack the simplicity, reliability, portability, relative permanence, universality, and familiarity of paper. In many situations, paper remains the simplest and most effective way to store and distribute information.

The conveniences and advantages that paper offers signal that its complete replacement is not likely to occur soon, if ever. Perhaps then, the role of the computer is not to achieve a paperless society. Instead, the role of the computer may be as a tool to move effortlessly between paper and electronic representations and maintain connections between the paper and the electronic media with which it was created.

In U.S. Pat. No. 5,754,308, "System and Method for Archiving Digital Versions of Documents and for Generating Quality Printed Documents Therefrom," Lopresti et al. describe one method for moving between paper and electronic representations. The system uses an enhanced copier to scan a document information designator present on each page that uniquely identifies that page and enables retrieval of a stored digital representation of that page for output. This system requires hard copies of each page to be used for retrieval and does not guarantee security during the storage or retrieval processes.

Related, commonly owned applications for "Method and Apparatus for Composing Multimedia Documents," and "Multimedia Document Sharing Method and Apparatus," the disclosures of which are incorporated herein by reference, describe techniques for organizing multimedia documents into one or more collections. A collection coversheet representative of the collection can be printed on a suitable medium, such as paper. This coversheet can provide access to the collection by using a multi-function peripheral (MFP). In this way, individuals can share multimedia documents in the collection by distributing copies of the coversheet to recipients.

It is desirable to simplify the process of creating and manipulating document collections, so as to encourage users to make more effective use of such electronic storage mechanisms. Existing techniques provide user interfaces allowing users to specify, via input devices such as buttons and touchscreens, what operations are desired. However, what is needed is a system and method that simplifies operation of the system by allowing a user to specify desired operations without having to learn or use a user interface.

In many situations, users may wish to add annotations to stored documents and collections. What is needed is a mechanism for automatically reading such annotations, processing them if appropriate, and adding them to the electronically stored copies of documents and collections. What is further needed is a mechanism for performing such operations in a simple, easy-to-use way.

Often, a user wishes to provide different levels of access to a document or collection to different individuals. What is needed is a mechanism for providing such different levels of access for different users, while maintaining the convenience of using coversheets to provide access to collections.

SUMMARY OF THE INVENTION

According to one aspect, the present invention simplifies the process of inputting documents into a collection. Rather than specifying a collection organization and hierarchy via a user interface, the user simply arranges the documents in an order that represents the desired organization. The system of the present invention interprets the order in which documents are presented upon input, and arranges the documents in a particular organization and hierarchy according to the presented order.

For example, if the first document identifies an existing collection, subsequent documents are added to the identified existing collection. If the first document does not identify a collection, the first document and subsequent documents are added to a new collection. If, in either of these processes, a subsequent document identifies a collection, the identified collection is added as a subcollection (or, alternatively, the documents within the second collection are individually added to the first collection).

According to another aspect, the present invention provides an input mechanism for accepting and storing annotations provided by a user. As described in related applications referenced above, a collection coversheet representative of the collection is printed on a suitable medium, such as paper for example. According to this aspect of the invention, the user can annotate the collection coversheet, for example by writing on it with an ordinary pen or pencil. The coversheet (or other piece of paper containing annotations) is then scanned, and the user's annotations are added to the collection.

According to another aspect, the present invention provides a mechanism for granting different levels of access to a collection or document to different individuals. As described in related applications referenced above, a collection coversheet representative of the collection is printed on a suitable medium, such as paper for example; the coversheet then provides access to the collection. According to this aspect of the invention, the coversheet also specifies a level of access, such as read-only access, add-only access, or full permission. Upon scanning the coversheet, the system of the invention grants the level of access specified by the coversheet.

Thus, users can share documents in the collection by distributing copies of coversheets to recipients, and the recipients can be granted differing levels of access to the collection according to indicators on their respective coversheets.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

Figure 1A:
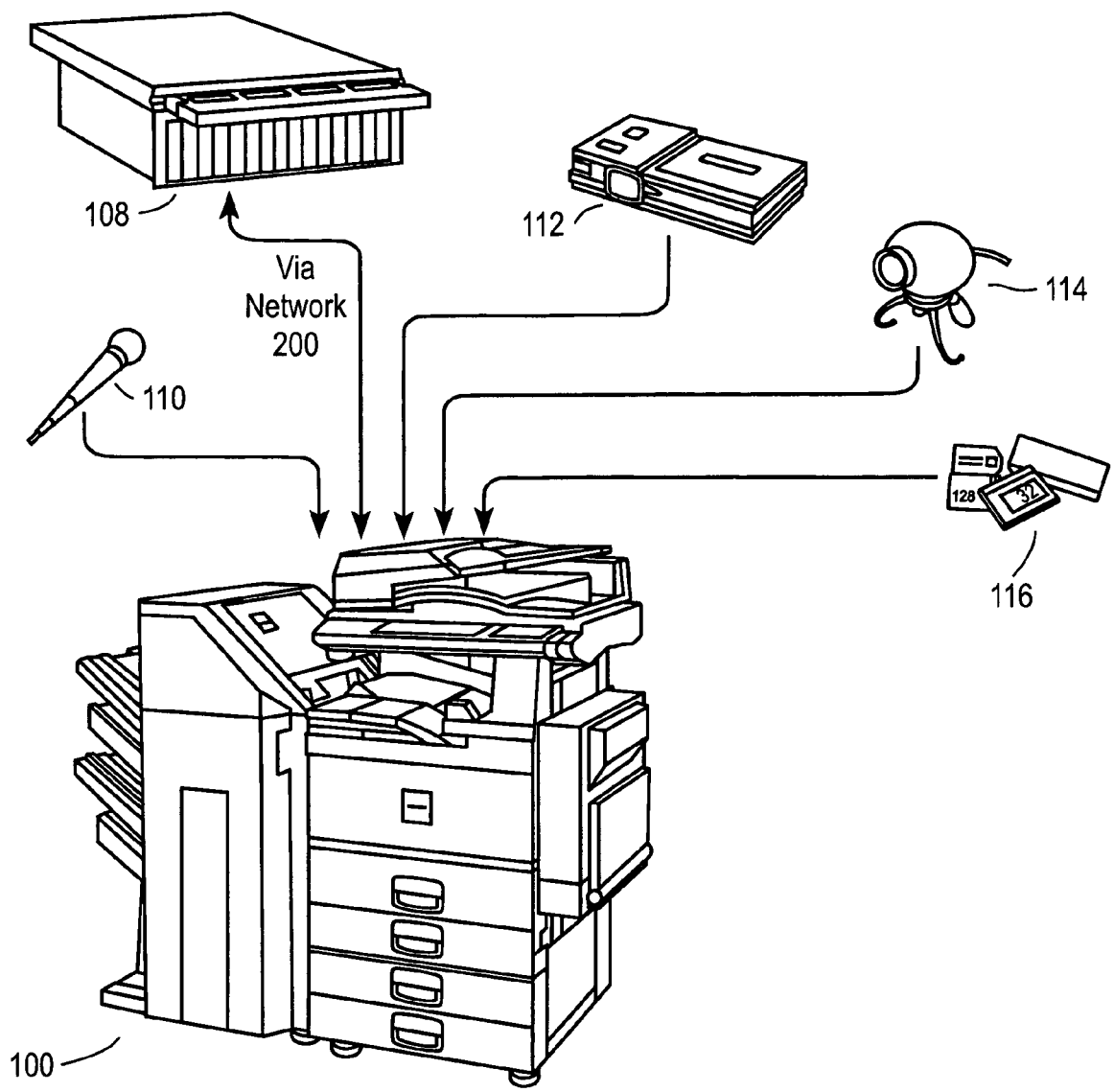
FIG. 1A is a pictorial representation showing a multi-function peripheral and associated devices as can be used in one embodiment of the present invention.

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

In this application, the term "document" refers to any collection of information capable of being stored electronically, including but not limited to text, word processing and spreadsheet files, e-mail messages, voice and audio recordings, images and video recordings.

The terms "paper", "paper medium", or "sheet" as used in this application are intended to refer to any tangible medium on which information can be formed whether by a printing process, written, drawn, imprinted, embossed, etc. For purposes of this invention, the term "printing" is intended to encompass all manner of forming images on an image-bearing medium whether by optical, mechanical, thermal, or electrical methods, or combinations thereof.

The term "collection" refers to one or more groups of electronic documents or media that might include digital images, audio recordings, scanned images from pages of a document, and/or files such as Microsoft Word documents or Microsoft Excel spreadsheets. Collections can also contain pointers to other collections. Collections can include user-provided markings, annotations, and the like. Collections can also include metadata representing related information such as date of creation, modification date, access permissions, and the like.

For purposes of the following description, a collection is stored on a collection server (or other storage device). Each collection has a specific, unique address or identifier, such as a uniform resource locator (URL), which provides a pointer to the collection. References herein to a pointer, collection identifier, or distributed resource identifier (DRI) can be considered to refer to a URL or any other mechanism, tag, handle, pointer, or technique for identifying a file, collection, directory, or other group of files.

As described in the above-referenced related patent applications, a coversheet can be generated for a collection. The coversheet includes a representation of the contents of the collection with, in one embodiment, an overview image showing thumbnails that represent all of the documents in the collection, and a representation of the unique identifier for the collection. In one embodiment of the present invention, the techniques described herein are combined with the coversheet methods and systems described in the related patent applications.

System Architecture

Figure 2:
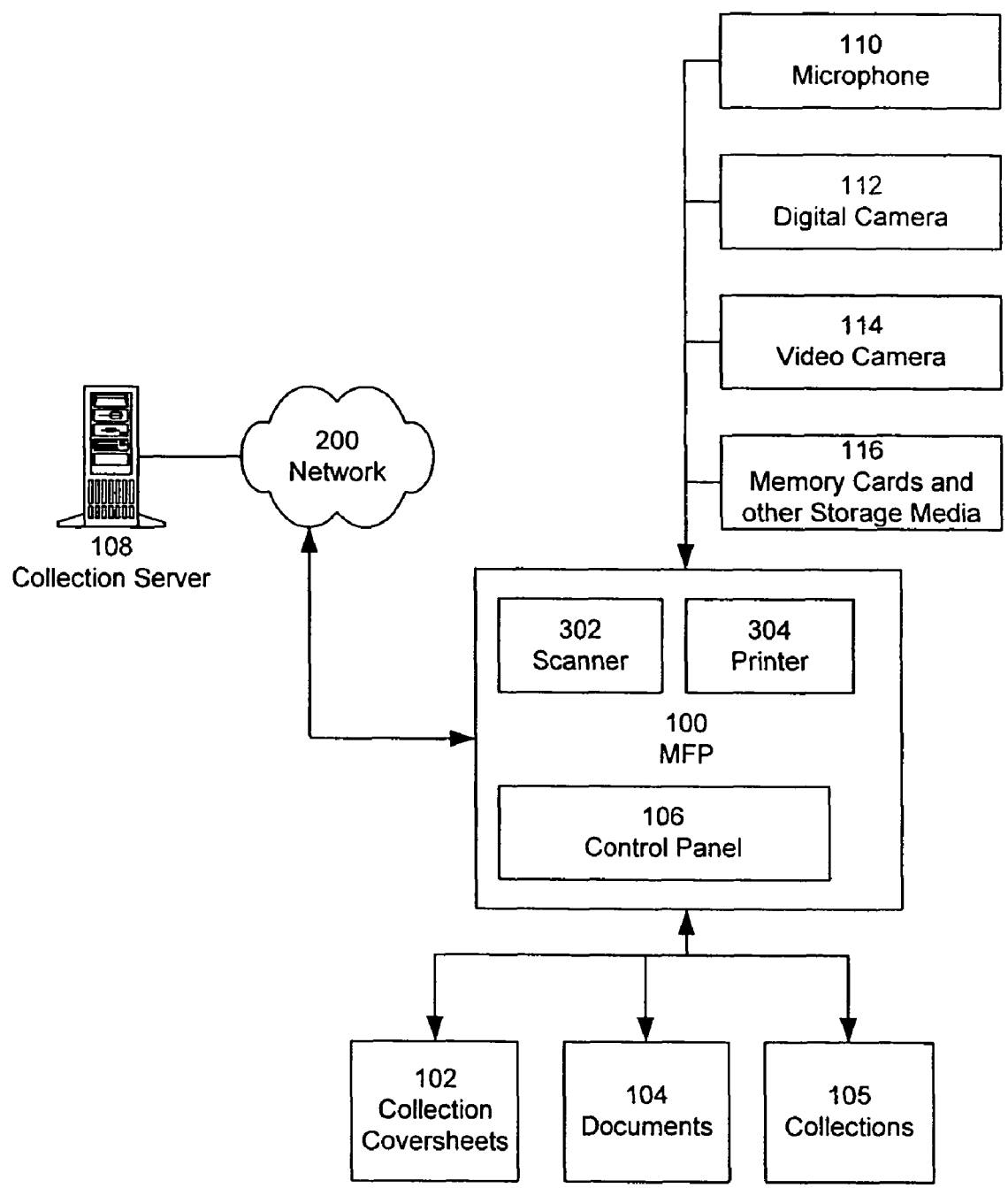
FIG. 2 is a block diagram depicting an overall architecture for practicing the present invention according to one embodiment.

Referring now to FIG. 1A, there is shown a pictorial representation of an illustrative embodiment showing the various components that are part of the present invention. Referring also to FIG. 2, there is shown a corresponding block diagram, containing various functional components. Multi-function peripheral (MFP) 100 is connected through a network 200 to collection server 108 for storing collections 105 of documents 104. MFP 100 provides functionality for creating and modifying collections 105, and for communicating with server 108 for the purpose of transmitting and receiving collections 105 and documents 104.

For illustrative purposes, FIGS. 1A and 2 depict several different data capture devices. In a particular embodiment, a MFP 100 scans documents 104 and coversheets 102 via scanner 302 (scanner 302 is not shown in FIG. 1A, as it is internal to MFP 100). Additional capture devices include but are not limited to microphones 110, digital cameras 112, video cameras 114, memory cards and other removable media 116, as well as additional devices (not shown). Any or all of devices 110, 112, 114, 116, as well as collection server 108, can be connected directly to MFP 100 or can be connected via network 200. Documents 104 and collections 105 can also be received and transmitted via fax, e-mail, or other communication means. MFP 100 also has the ability to output documents 104 and coversheets 102 by printing them via printer 304 (printer 304 is not shown in FIG. 1A, as it is internal to MFP 100).

Figure 1B:
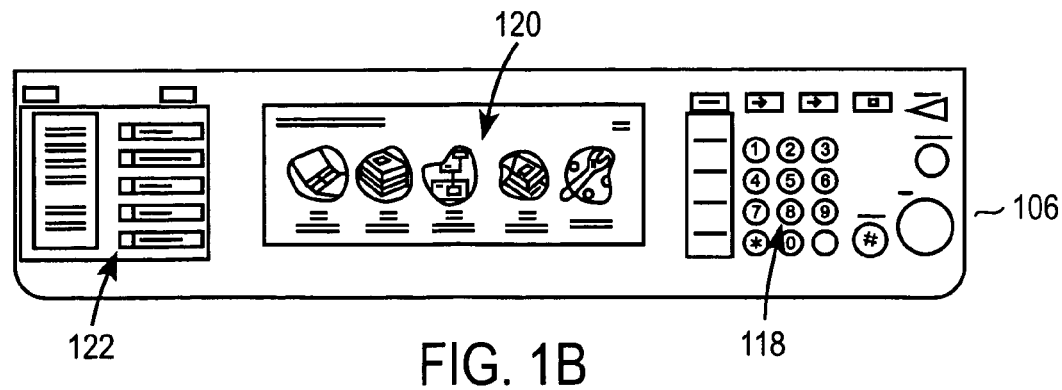
FIG. 1B is a pictorial representation of a control panel for a multi-function peripheral.

MFP 100 also includes, in one embodiment, control panel 106 that provides a user interface for controlling MFP 100. Referring momentarily to FIG. 1B, there is shown an example of a control panel 106 for MFP 100. Control panel 106 may include, for example, any or all of keypad 118, buttons (not shown), and touchscreen displays 120. In one embodiment, control panel 106 also provides feedback to the user through display 120 and indicator lights 122. For example, control panel 106 may indicate a current state of MFP 100, or might indicate the task or action currently being performed by MFP 100.

Also shown in FIG. 2 is collection 105, including documents 104, and collection coversheet 102. As described in the above-referenced related applications, coversheets 102 provide a convenient mechanism for accessing, retrieving, and distributing documents 104 and collections 105. The present invention provides several enhancements and improvements to the functionality and usage of MFP 100 in connection with coversheets 102, documents 104, and collections 105.

Additional details concerning the architecture and operation of MFP 100 are provided in the above-referenced related applications, the disclosures of which are incorporated herein by reference.

Collections and Coversheets

Figure 5A:
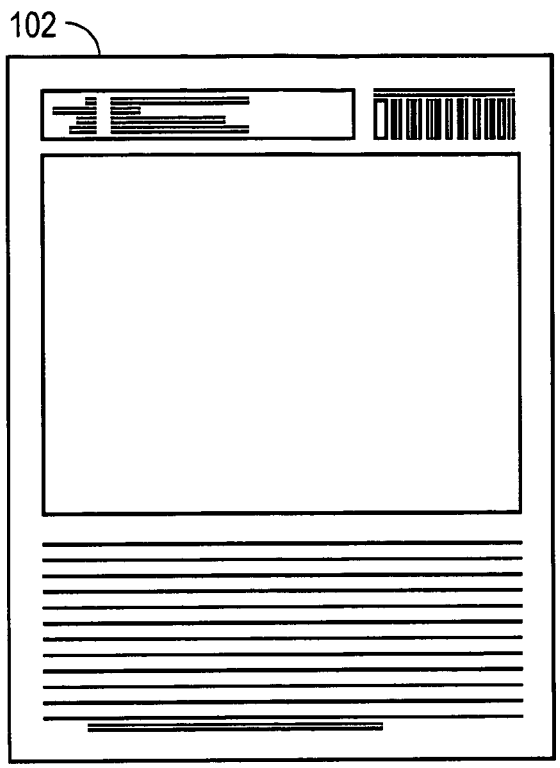
FIG. 5A depicts an example of an empty collection coversheet in accordance with an embodiment of an aspect of the present invention.

Referring now to FIG. 5A, there is shown an example of a collection coversheet 102 for an empty collection 105. An empty collection 105 contains no documents 104, and is essentially a placeholder for storing documents 104 in the future.

Figure 5B:
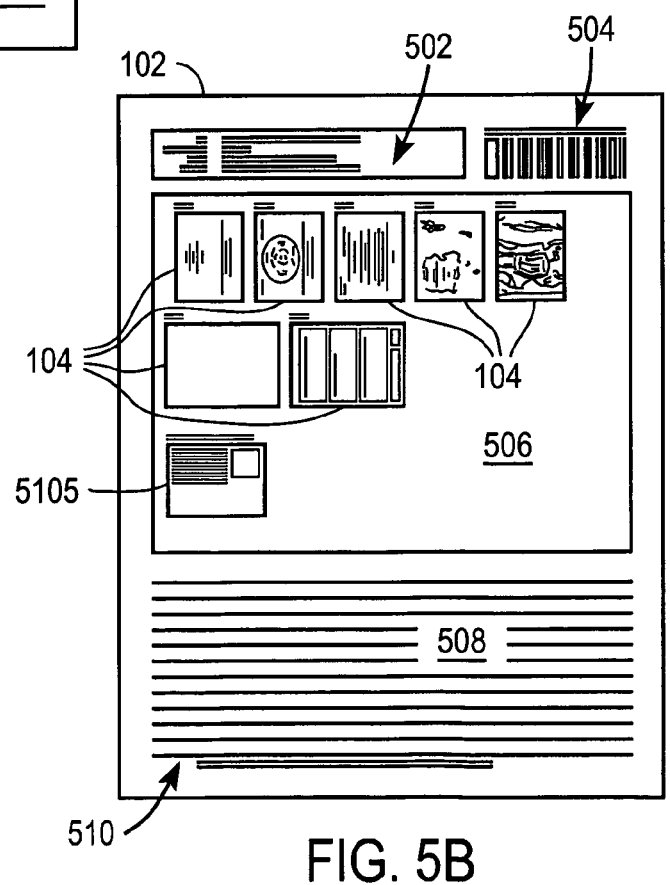
FIG. 5B depicts an example of a non-empty collection coversheet in accordance with an embodiment of an aspect of the present invention.

Referring now to FIG. 5B, there is shown a collection coversheet 102 for a collection 105 having seven documents 104 and one subcollection pointer 5105. Three documents 104 are images from a digital camera, four documents 104 are scanned pages from MFP 100, and subcollection pointer 5105 is a pointer to another collection 105 containing two documents 104. Collection overview 506 provides an overall representation of collection 105, including thumbnails of the documents 104 and subcollection pointer 5105 therein.

In one embodiment, collection coversheet 102 is a piece of paper that includes several elements: header 502, machine-readable bar code 504, human-readable collection identifier or pointer 510, and collection overview 506. In addition, coversheet 102 includes area 508 in which the user may write annotations. As will be described in more detail below, such annotations can be scanned by MFP 101 and added to collections 105 according to the techniques of the present invention.

In one embodiment, header 502 contains printed information about collection 105, including for example: the author; a list of zero, one or more individuals to be notified if the collection 105 is modified; time and date information of collection 105 creation, modification, and/or printout; and collection 105 topic or subject.

One skilled in the art will recognize that the present invention can be implemented using other types and arrangements of coversheets 102, and that such coversheets 102 may be provided on media other than paper.

Collection Identifier

As described in the related applications, machine-readable bar code 504 contains an encoded representation of a unique pointer to collection 105 on collection server 108. This pointer is referred to herein as a distributed resource identifier (DRI). When presented in human-readable form 510, a DRI can take on a form similar to a uniform resource locator (URL) as is commonly used to identify documents in the World Wide Web. In one embodiment, the present invention uses DRIs as unique collection pointers. DRIs are globally unique, difficult to guess, and can provide access to collections from remote locations, via a network such as the Internet.

Within this description, the terms "pointer", "collection identifier", "distributed resource identifier", and "DRI" are used interchangeably to represent a unique identifier that points to a stored collection 105 (or, in some cases, to a document 104). In some cases, more than one identifier points to the same collection 105, in order to provide different ways of accessing that collection 105. Identifiers can be represented in human-readable form and/or machine-readable form.

The DRI for a collection 105 may point to a directory that contains the collection of documents as well as information used to build the collection overview and some additional metadata. A DRI can also point directly to an individual document 104.

Bar code representation 504 of a DRI allows for automated access to the collection without requiring the user to manually enter the location; rather, MFP 100 scans coversheet 102 to obtain the DRI. It will be appreciated, of course, that any machine-readable indicium can be used instead of bar code 504; in one embodiment, MFP 100 employs optical character recognition (OCR) to read a human-readable representation 510 of a DRI.

Since a collection 105 can include several documents 104, the DRI is often a directory reference rather than a reference to a particular file. For example, in an operating system such as Unix, the DRI can be a directory reference such as /usr/collection. Alternatively, the DRI can refer to a file that in turn leads to an identification of the constituent elements (documents 104) of a collection 105. In still another alternative, the DRI can be a reference to a database that stores collection 105. It will be appreciated that many other alternatives for storing collections of information may be used.

In accordance with an aspect of the invention, the text of the DRI 510 may be made up of a string of characters that includes a random text component. This randomly generated text provides a measure of security; it helps prevent access to a collection because it is non-intuitive and virtually impossible to guess. Identifying a collection with an identifier that has no correlation to the content of the collection may present a strong impediment to hacking attempts; the hacker simply has no idea where the collection may be located, or that the collection even exists.

The example DRI "/root/usr/collection" assumes a single-machine architecture. In a more generalized configuration of two or more machines, the DRI can include a machine name component. For example, a URL format for identifying World Wide Web pages might be used. In accordance with this particular embodiment of the invention, the DRI constitutes the path portion of the URL. Purely by convention, the path portion uses the following naming format according to a particular embodiment of this aspect of the present invention:

. . . /-DDS-/ORIGIN/ . . . , where:

DDS is the name of a particular repository of collections 105; and

ORIGIN is the fully-qualified hostname of the origin server for the collection 105 identified by the DRI.

Thus, for example, suppose a collection 105 is identified by the following URL:

http://machine1.com/-msg-/machine2.com/2002/1022/398hy9y8h8#$30er#/1/

The domain corresponding to the machine that stores collection 105 is identified by "machine1.com." The path portion refers to a collection 105 stored in a repository named "-msg-." The original collection 105 (i.e., its place of creation) is located on a machine named "machine2.com." Thus, in this case, "machine1" contains a copy of the collection 105. In this particular embodiment of the invention, collections 105 are contained in directories, though other data storage conventions can be used; for example, collections 105 can be stored and managed in a database. The collection 105 shown in the example above is stored in a directory called:

"/2002/1022/398hy9y8h8#$30er#/1/"

The string "398hy9y8h8#$30er#" represents randomly generated text. Finally, as will be discussed below, the directory represented by the terminal pathname "/1/" refers to the first (initial, original, base, etc.) version of the collection 105.

In this particular embodiment, both the host machine ("machine1") and the origin machine ("machine2") use the following directory structure and URL naming structure. The host machine has a directory called "-msg-" contained in a directory for storing collections 105. The "-msg-" directory has a sub-directory called "machine2.com" which contains all the collections originating on "machine2.com." Generally, a sub-directory is provided for each machine that can be an originator of a collection.

A DRI represents a collection 105 by providing a unique, secure pointer to a directory or to a file within that directory on a collection server 108. Given the DRI, a person or machine has enough information to access the collection 105.

It is possible to modify a collection 105, for example, by adding new documents 104; adding, deleting, or modifying annotations (as will be described in more detail below); or modifying or deleting existing documents 105. In one embodiment, when a collection 105 is modified, the terminal pathname in the collection 105 is incremented so that the original collection 105 with the original DRI is unchanged and the new collection 105 is placed in a new directory. This allows a DRI to always point at the same unmodified collection 105 and at the same time, make newer versions of the collection 105 easy to find. Symbolic links, or "aliases", can be established between files representing documents 104, so that a single data file can appear to be located in two separate directories. Using such links, different versions of a collection 105 can be built without duplicating any data files because a file that appears in the /1/ and the /2/ version can be linked rather than duplicated.

Accordingly, in one embodiment, when a collection 105 is modified, a new directory is created (such as /2/) and symbolic links in /2/ are created that point to files in /1/. Files need not be duplicated. New files added to the new version of the collection 105 reside directly in /2/, and files which were in /1/ and are not in /2/ remain without links. The annotations, overview, and metadata in /2/ are modified appropriately.

Inputting Documents

The present invention provides improved techniques for allowing a user to create new collections 105 and to populate existing collections 105 with documents 104. New collections can be created as follows: The user can input data from paper documents 104 by placing the documents 104 on an automatic document feeder (not shown) for scanning by scanner 302 of MFP 100. The user can input documents 104, images, or other files or data from electronic media such as a memory card by placing the media 116 in an appropriate reader (not shown) connected to MFP 100. According to techniques described in more detail below, the user places the documents 104 or other data in a particular order to indicate that a new collection 105 should be created; in response, MFP 100 proceeds to retrieve any media placed on or in MFP 100 by the user or recorded by the user. Those skilled in the art will understand that it is possible to find media by checking sensors, activating scanners, or searching file systems on connected memory cards. MFP 100 stores all the retrieved media in the newly created collection.

Including an Existing Collection in a New Collection

As documents 104 are input into a collection 105, MFP 100 searches the documents for machine-readable indicia containing DRIs 504. Techniques for locating barcodes in images are known in the art and available from a variety of sources. MFP 100 can recognize that a page containing a DRI represents a collection 105. As described in more detail below, MFP 100 can be programmed such that inserting a page with a DRI into any collection 105, new or existing, is understood as a request to add that collection 105 to the new collection 105. In other words, the page containing the DRI represents a request to add the collection 105 pointed to by that DRI to the collection 105 currently being created or added to. In one embodiment, the overview image of that collection 105 is retrieved and added as a thumbnail to the new collection 105 and the subject of that collection 105 is used as the title for the thumbnail.

Separating Documents

Figure 7:
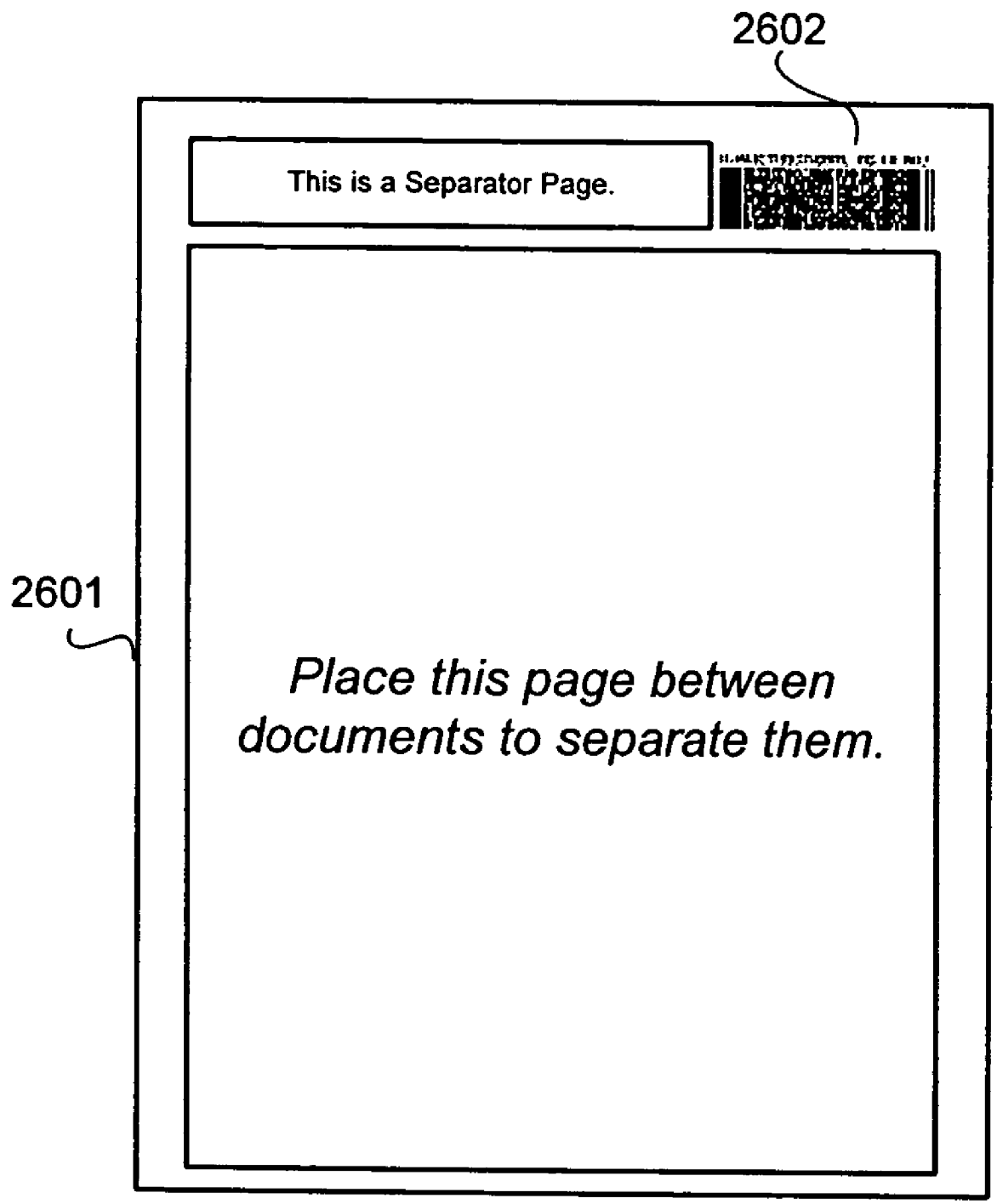
FIG. 7 depicts an example of a separator page for separating documents for individual storage.

As a user is creating a new collection 105 or adding to an existing collection 105, it may be desired to rapidly input a series of documents 104 to MFP 100. A separator page 2601, an example of which is shown in FIG. 7, can be used to denote the end of one document 104 and the beginning of a new document 104. MFP 100 detects separator page 2601 and, thereby recognizes that a new document 104 is about to begin. Separator page 2601 makes it possible for the user to queue several documents for MFP 100 to scan in one stack. In one embodiment, separator page 2601 is an easily produced sheet of paper with a printed machine-readable indicator such as a barcode 2602. Separator page 2601 may be similarly formatted as a collection coversheet. Alternatively, separator page 2601 may be any kind of separator identifiable by MFP 100.

According to one embodiment, MFP 100 scans each input page for a machine-readable indicator. When separator page 2601 is scanned, MFP 100 reads barcode 2602, recognizes that it is a separator page 2601, and begins to store subsequently input pages as a separate document 104.

Adding to an Existing Collection

When a user wishes to add documents 104 to an existing collection 105, the user provides a DRI to identify the existing collection 105. The user can indicate to which collection 105 to add documents 104 by inputting the DRI manually, or by providing a coversheet 102 including a machine-readable indicator of the DRI. The advantage of having a machine-readable DRI identifying the collection 105 is that MFP 100 or any device that can locate and decode machine-readable codes can determine which collection 105 is represented by the coversheet 102. There are many other methods for presenting the MFP 100 with a machine-readable DRI, and those methods and techniques are not enumerated here because they are understood by those skilled in the art.

Determining Collection Organization and Hierarchy by Document Order

In one embodiment, the user need not explicitly specify, via a control panel 106 or other user input device, operations such as creating new collections 105 or adding to existing collections 105. Instead, the order in which documents 104 are presented to MFP 100 determines which task will be performed. In this manner, the user is not required to explicitly specify an action; rather, he or she merely provides the documents 104 in a particular order, and MFP 100 automatically performs the desired action based on the order. Accordingly, collection 105 organization and hierarchy are specified by document 104 order.

Figure 8:
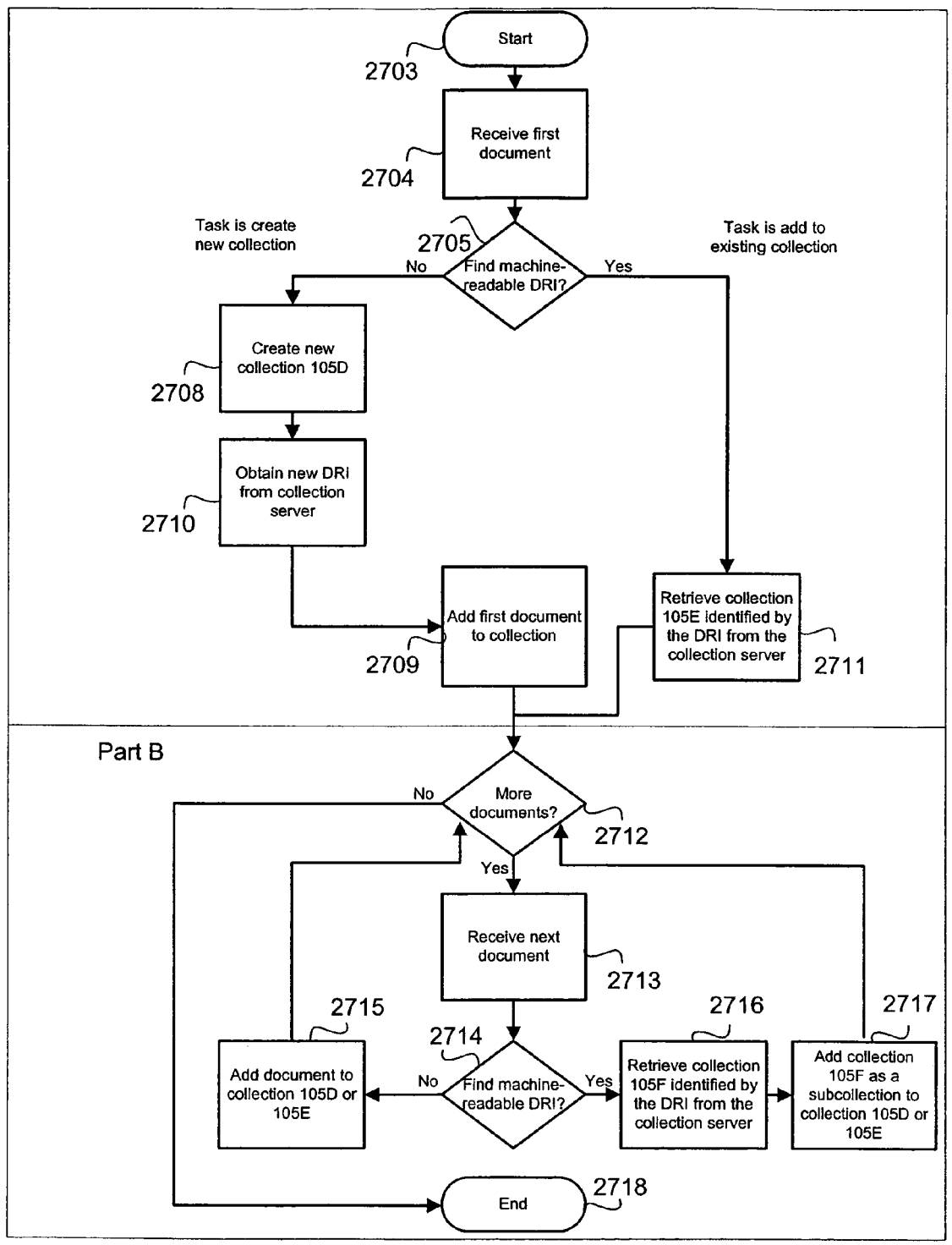
FIG. 8 is a flow chart depicting a method for using document order to determine collection organization and hierarchy, according to one embodiment.

Referring now to FIG. 8, there is shown a flow chart depicting an example of a method for determining collection 105 organization and hierarchy by document 104 order. One skilled in the art will recognize that the particular configuration and method of FIG. 8 is merely exemplary, and that MFP 100 can be configured to perform different actions in response to document order, and in response to the presence or absence of a DRI.

In the example, MFP 100 determines whether to create a new collection 105 or add to an existing collection 105 by determining whether the first presented document 104 of a group of one or more documents 104 contains a DRI. If the first document 104 contains a DRI, the document 104 and subsequent documents 104 are added to the collection 105 identified by the DRI. If the first document 104 does not contain a DRI, a new collection 105 is created, and the document 104 and subsequent documents 104 are added to the new collection 105.

Part A. In Part A of the method, MFP 100 receives 2704 a first document 104. If, in 2705, MFP 100 finds no machine-readable DRI, MFP 100 assumes that the user wishes to create a new collection (steps 2708 to 2710); for illustrative purposes, this new collection is referred to as collection 105D. MFP 100 creates 2708 a new collection 105D, obtains 2710 a new DRI from collection server 108 for collection 105D, and adds 2709 first document 104 to collection 105D. MFP 100 then proceeds to Part B of the method, as described below.

If, in 2705, MFP 100 finds that the first document 104 does contain a DRI, MFP 100 assumes that the user wishes to add to an existing collection; for illustrative purposes, this existing collection is referred to as collection 105E. MFP 100 retrieves 2711 collection 105E identified by the DRI from the collection server 108. Additional documents 104, processed in Part B as described below, are added to collection 105E.

Part B. Part B proceeds as follows. MFP 100 determines 2712 whether any more documents 104 are presented. If not, the method ends 2718. If any documents are presented, MFP 100 receives 2713 the next document 104 and determines 2714 whether a machine-readable DRI can be found on this document 104. If no machine-readable DRI can be found, the document 104 is added 2715 to collection 105D or 105E.

If, in 2714, MFP 100 does find a machine-readable DRI on the document 104, then MFP 100 retrieves 2716 the collection identified by the DRI from collection server 108; for illustrative purposes, this collection is referred to as collection 105F. MFP 100 then adds 2717 collection 105F as a subcollection to collection 105D or 105E. The overview image of the collection 105F is retrieved and added as a thumbnail to collection 105D or 105E, and the subject or title of collection 105F is used as the title for the thumbnail. For example, if a user presents a stack of documents containing a first document 104 followed by a second document 104, followed by a coversheet 102, the MFP 100 would create a new collection 105D, populate the new collection 105D with the first two documents 104, and add the collection 105F identified by the DRI on the coversheet as a subcollection.

After completing step 2715 or 2717, MFP 100 returns to step 2712 to determine whether more documents 104 are presented. If so, each document is received and processed as described above. When no more documents 104 are presented, the method ends 2718.

Figure 3:
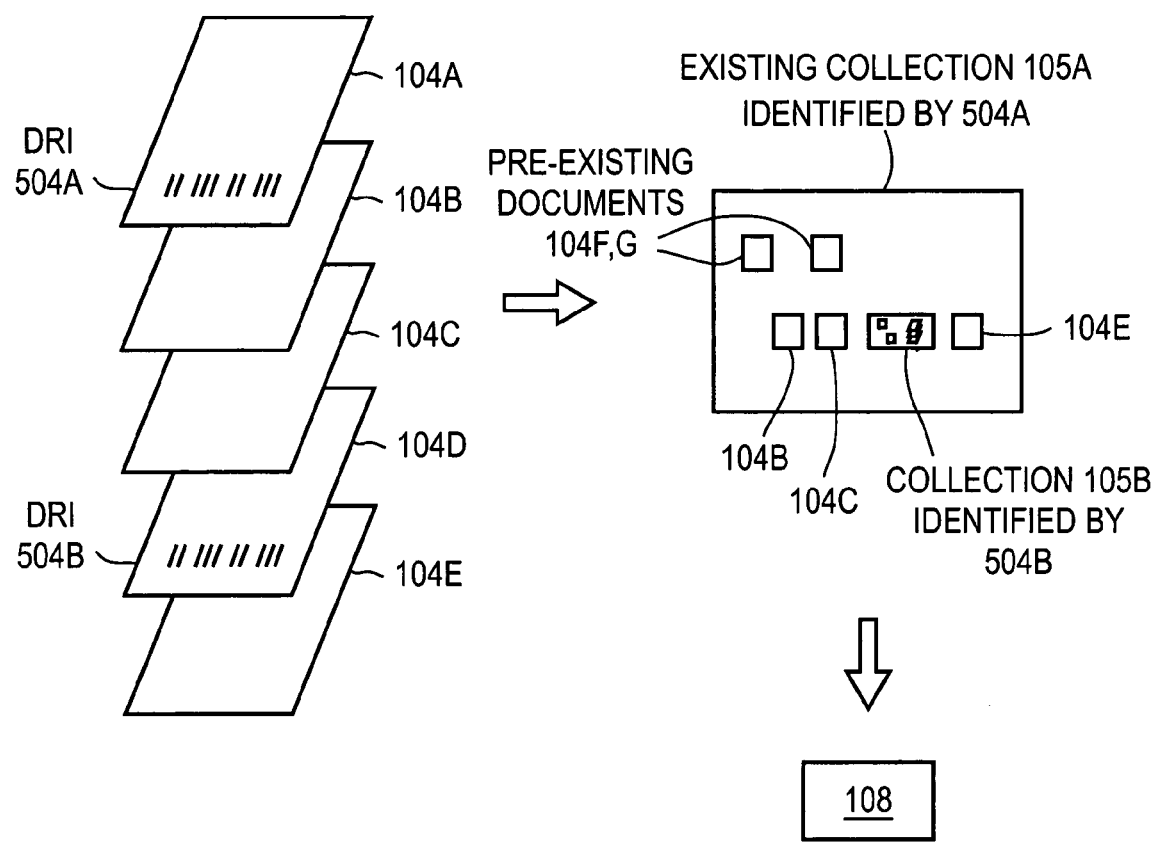
FIG. 3 is an example of a sequence of documents for adding material to an existing collection.
Figure 4:
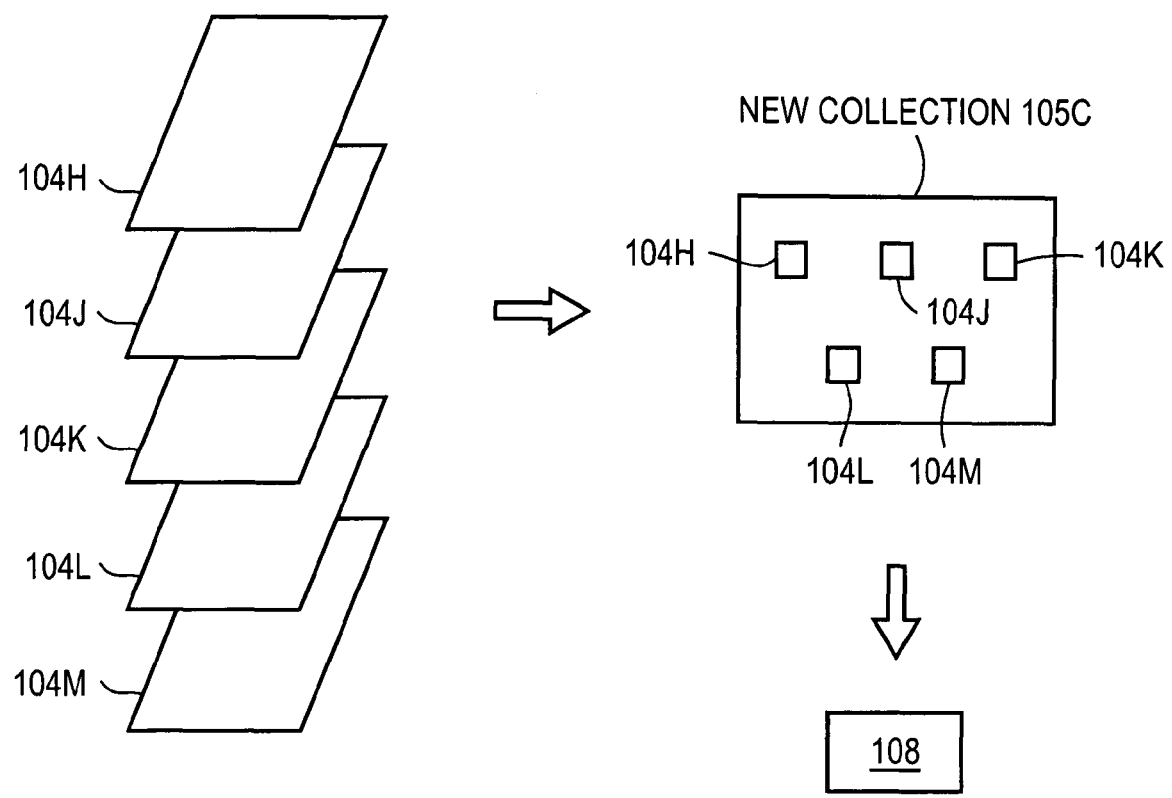
FIG. 4 is an example of a sequence of documents for creating a new collection.

Referring now to FIGS. 3 and 4, there are shown two examples of document sequences that dictate particular actions to be performed by MFP 100. In FIG. 3, documents 104A through 104E are provided in a stack, with document 104A being presented first. It is assumed, for illustrative purposes, that MFP 100 receives the documents 104 in a top-down order; however, the documents 104 could instead be received in a bottom-up order. First document 104A includes a DRI 504A, causing MFP 100 to access existing collection 105A identified by DRI 504A. Documents 104B and 104C are then added to existing collection 105A; in one embodiment, documents 104B and 104C are placed in a new subcollection which in turn is added to existing collection 105A. Document 104D includes DRI 504B, causing MFP 100 to include, in collection 105A, the collection 105B identified by DRI 504B. As described above, collection 105B can be included as a subcollection of collection 105A, or alternatively the individual documents (not shown) of collection 105B can be included in collection 105A. Then, MFP 100 proceeds to add document 104E to collection 105A. Once the appropriate documents 104B, C, E, and the collection 105B, have been added to collection 105A, collection 105A is stored in collection server 108.

In FIG. 4, documents 104H through 104M are provided in a stack, with document 104H being presented first. First document 104H does not include a DRI. This causes MFP 100 to create a new collection 105C. Documents 104H through 104M are then added to new collection 105C, and collection 105A is stored in collection server 108.

Annotations

In one embodiment of the invention, a user can annotate collections 105 in several ways, for example by using electronic drawing tools or by marking directly on coversheets 102. If the user has requested an opportunity to add annotations, the MFP 100 can present a canvas and an object-based drawing tool like those found in Microsoft's PowerPoint software or Adobe Illustrator or similar programs. A user may also mark directly on a coversheet 102 with a conventional writing implement such as a pen, either to indicate commands to the MFP 100 or to make annotations as desired in the overview area 506 or in the note-taking space 508. MFP 100 detects such annotations and performs the requested operation: either by performing specified commands, adding the annotations to the appropriate documents 104 within collection 105, or adding a new document 104 including the annotations.

Figure 9:
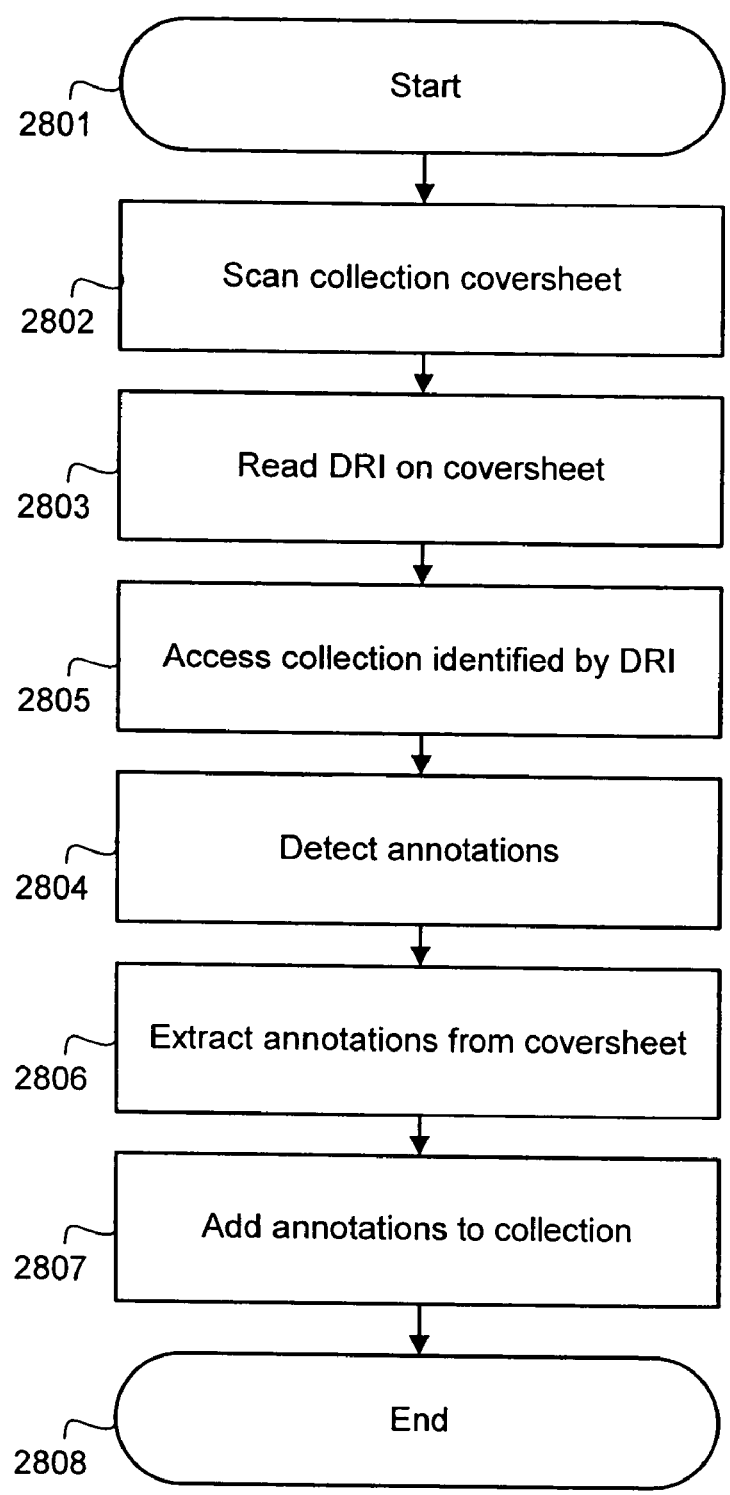
FIG. 9 is a flow chart depicting a method for adding notes to a collection, according to one embodiment.

Referring now to FIG. 9, there is shown a flowchart depicting a method for detecting and processing user-added annotations made on a coversheet 102, according to one embodiment. One skilled in the art will recognize that the various steps depicted in FIG. 9 can be performed in any order, and that the invention is not limited to the particular order depicted.

MFP 100 scans 2802 collection coversheet 102, reads 2803 the DRI on coversheet 102, accesses 2805 collection 105 identified by the DRI, and detects 2804 the presence of annotations. Various methods of detecting marks on a document are known in the art and have been described in related cross-referenced applications. In one embodiment, MFP 100 automatically detects notes when a coversheet 102 is scanned, and MFP 100 optionally automatically continues the process to add notes to collection 105.

Although the exemplary method is described in terms of detecting annotations on coversheet 102, other mechanisms for receiving annotations from a user may be employed. For example, in another embodiment, the user can request, via a command entered on control panel 106 or other input device, an opportunity to add notations. This option may also be provided as a prompt by MFP 100, either automatically or in response to certain predefined conditions (such as previously received notations, previously set user preferences, or any other condition). If the user indicates that he or she wishes to add annotations, he or she can do so via control panel 106 or other input device. Annotations can also be input via e-mail transmission, fax transmission, or any other communication method. For example, a user can fax to MFP 100 an image of a coversheet 102 including annotations.

MFP 100 extracts 2806 the annotations from the coversheet. In one embodiment, extracting 2806 the annotations includes imaging the entire coversheet; alternatively, MFP 100 can image only the notes area 508 of coversheet 102. If notes area 508 has lines to facilitate note-taking, the MFP 100 optionally removes those lines from the image. If desired or appropriate, the image is processed using optical character recognition (OCR) or other methods for ascertaining the content of the image. Alternatively, the image may be retained in bitmapped form with no processing, or it may be converted to a graphical description language such as Scalable Vector Graphics (SVG) or PostScript. In one embodiment, the user is given an opportunity (via control panel 106 or other input/output means) to select whether the image should be processed and how. The image can be appropriately time and date-stamped, and/or additional information (such as authorship) may be added. MFP 100 then adds 2807 the image of the extracted notes to collection 105; the image may be added as a separate document 104, or it may be added to an existing document 104, or it may be added in such a manner that it is not part of any document 104 but is visible in overview 506 for collection 105. Alternatively, MFP 100 can add the image to an existing document 104.

In one embodiment, annotations are added to a collection 105 and not to a document 104 within the collection. When annotations are added to collection 105 via notes area 508 of coversheet 102, the annotations are added as an image in collection 105. The notes are not part of an existing document 104, although they may be associated with a document 104 either by proximity on coversheet 102 or by an indication that the notes were added to collection 105 soon after the document 104 was added.

Limiting Access Permissions Through Differentiated Collection Identifiers

In one embodiment of the invention, MFP 100 provides the capability to generate a coversheet 102 that grants limited permission to access a collection 105. For example, in response to a user's request, MFP 100 can provide a coversheet 102 that grants "read-only" or "add-only" access. A coversheet 102 granting "read-only" access allows the recipient of the coversheet 102 to read, view, share, or print a collection 105 but does not allow the recipient to modify the collection 105. A coversheet 102 granting "add-only" access allows the recipient to add documents 104 (and/or other media) to the collection 105 but does not allow the recipient to access any of the documents 104 already in the collection 105. In one embodiment, a recipient of an add-only coversheet 102 is therefore unable to modify documents 104 he or she has added to collection 105; the level of access is akin to a "drop-box". One skilled in the art will recognize many different levels and types of access can be granted, including for example:

- administrative-level access (allows a user to change access levels for other users);
- read-only (allows a user to view, read, listen, watch, print, fax, or email);
- insert-(or add-) only (allows a user to add new documents and annotations); and
- edit/delete (allows a user to move and resize documents, change annotations, delete documents, and delete annotations).

In addition, in one embodiment a "filter" mode is available, which causes an access level of a subcollection to be inherited from (or limited by) the access level of the containing collection.

In one embodiment, a collection identifier (such as a DRI) specifies a level of access, for example by providing a particular path to a collection 105 that implicitly includes the access specification. In addition, different collection identifiers can be provided for a particular collection, each collection identifier specifying a different level of access. Such functionality may be implemented, in one embodiment, using techniques analogous to Unix file system permissions and symbolic links. Each data file in a Unix file system has at least one pointer to the file stored in a directory. Links can be created which exist in other directories or perhaps in the same directory but with a different name. These links point to the exact same data on the disk as the original file, but have different metadata. That metadata includes the filename and full pathname, as well as file permissions. Unix files can be given restricted access that limits or allows certain individuals to read or write the file. A file can be set up so that it can be read, written, or deleted by anyone. The same file, through a link, can be given a more restrictive set of permissions, perhaps only letting one or a few people read the file and letting no one delete it. Even though two different pointers point to the same data, the particulars of the access level for the data depends on the restrictions specified in the pointers, not in the data.

Thus, in one embodiment MFP 100 can create multiple coversheets 102 allowing different access levels for a particular collection 105 or document 104. For example, a full access coversheet 102 can be generated as well as a coversheet 102 that grants limited access. The collection identifier or DRI printed on the full access coversheet 102 points to a directory via a path that allows full access to collection 105, while the collection identifier or DRI printed on the limited access coversheet 102 points to the directory via a different path that allows limited access to collection 105. As described in more detail below, an "-access-" file specifies different access privileges based on the path used to access the directory.

In one embodiment of the present invention, collection server 108 maintains a mapping between collection identifiers and collection 105 locations, and further maintains records to indicate the access permission level for each collection identifier. When an MFP 100 requests a particular type of access using a collection identifier, collection server 108 determines whether the identifier allows the requested access, and responds accordingly. Alternatively, collection server 108 can provide access permission information to MFP 100, and MFP 100 can make the determination as to whether to process with the request.

In one embodiment, the multiple access level techniques described herein are combined with secure access techniques described in related U.S. patent application Ser. No. 10/639,282 titled "Physical Key for Accessing a Securely Stored Digital Document," filed Aug. 11, 2003, the disclosure of which is incorporated by reference. Thus, physical keys can be printed or otherwise generated, wherein each physical key contains a collection identifier that identifies an access level. Different physical keys can provide different access levels for the same collection 105 or document 104. The physical key can then be used to initiate decryption of the referenced document 104 or collection 105, and can enforce the specified level of access to the decrypted document 104 or collection 105. For add-only access, the physical key can permit encryption of newly added documents 104 without permitting decryption or reading of the document 104 or collection 105.

Figure 6:
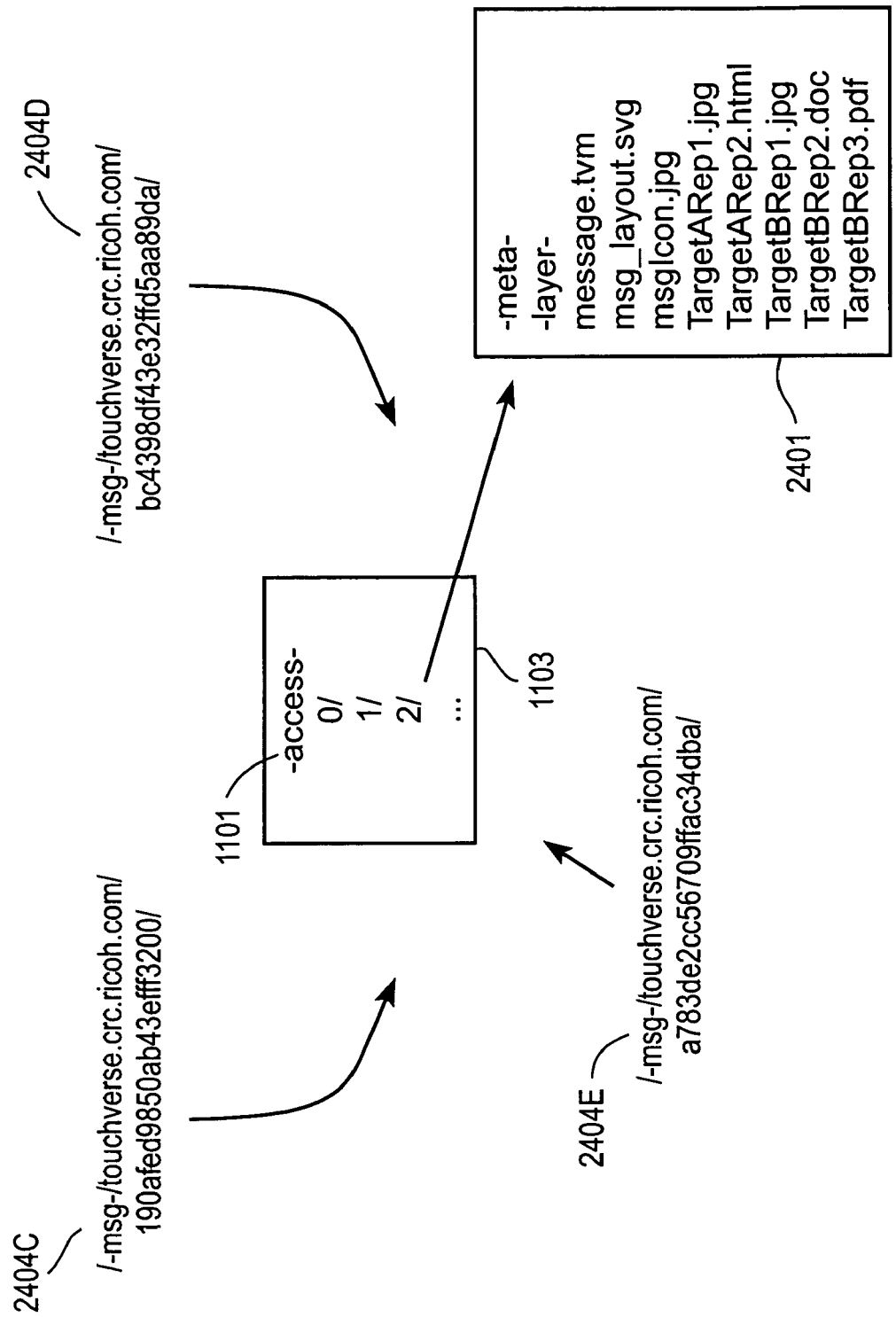
FIG. 6 is an example depicting three collection identifiers pointing to the same directory.

Referring now to FIG. 6, there is shown one possible approach for maintaining access level information. As shown in FIG. 6, such information can be kept in -access- file 1101. -access- file 1101 is located in directory 1103, which is pointed to by collection identifiers 2404C, D, and E. Directory 1103 also includes subdirectories such as 2401 (and others). Each subdirectory 2401 in directory 1103 includes a different version of collection 105.

Collection identifiers 2404C, D, and E provide different levels of access to documents 104 of collection 105. Such an arrangement requires no duplication of data; specifically, the collection information and files are stored at the same location. Each new version of collection 105 is stored in a separate subdirectory 2401 within directory 1103 pointed to by collection identifiers 2404C, D, and E. In the example shown, the file that stores access level information is referred to as "-access-", although any filename or file format can be used. In one embodiment, this file is stored in the same directory 1103 as the subdirectory 2401 containing documents 104 and other files; in another embodiment it is stored subdirectory 2401 (and/or other subdirectories) itself.

In one embodiment, -access- file is stored at server 108, and is never transmitted or revealed in full. Rather, server 108 only transmits or communicates that portion of the -access- file that is relevant or needed for a particular access request; alternatively server 108 consults the -access- file and allows or denies the requested access accordingly. In one embodiment, server 108 provides an API allowing authorized individuals to selectively edit the -access- file or portions thereof.

Several collection identifiers, or DRIs, can point to the same subdirectory 2401. As shown in FIG. 6, three unique collection identifiers 2404C, 2404D, and 2404E point to the same subdirectory 2401. -access- file 1101 specifies access levels corresponding to identifiers 2404C, 2404D, and 2404E. Directory 2401 contains various files accessible according to the specified access levels. In one embodiment, -access- file 1101 is an Extended Markup Language (XML) file specifying permitted operations on files in subdirectory 2401. An example of an excerpt of an -access- file 1101 is as follows:

```
<?xml version="1.0" encoding="UTF-8"?>
<accesscontrol
identityhash="b44b689d57f0a37e7da6855feaa792bd" >
    <access dri="/-msg-
/touchverse/602270e10ae23143483c5324ad10ae26/"
rights="aried">
        <access dri="2/TargetARep1.jpg" rights="r" />
    </access>
    <access dri="/-msg-
/touchverse/7f033ef5f460f9aed3483d77f74f377c/" rights="r"
/>
    <access dri="/-msg-
/touchverse/a1efc714aca292a3c7407961f44d6034/" rights=" ">
        <rect rights="rf" x="0" y="0" width="600"
height="200" />
        <polygon rights="i" points="200,0 350,0
350,600 200,600" />
    </access>
    <access dri="/-msg-
/touchverse/7cd0b356d7cf69f7e8f2a7ecd0f4003d/" rights="i" >
        <halfplanes rights="rf" lines="0,-1,200" />
<!-- Can append only if y >= 200 -->
    </access>
    <access dri="/-msg-
/touchverse/c9b7e5aa318b59acad4ca5e36463c2ac/" rights ="i"
>
        <access dri="*/overview.jpg" rights="r" /> <!-
- Read access to overview image -->
    </access>
    <access dri="/-msg-
/touchverse/4dbc87ae4854ce964b89275936e71306/" rights ="rf"
>
        <map orig="/-msg-
/touchverse/c33c235bea8ce75309f722b37d82cbb2/"
        new="/-msg-
/touchverse/6403cdd5dcde5cc3f6ed8efb25c2105b/" />
    </access>
</accesscontrol>
```

An example of an element in -access- file 1101 that would provide full access is as follows:

```
<access dri="/-msg-
/touchverse/602270e10ae23143483c5324ad10ae26/"
rights="areid" />
```

The "rights" parameter includes letters a, r, e, i, d, indicating admin, read, edit, insert, and delete rights.

An example of an element in -access- file 1101 that would provide read-only access is as follows:

```
<access dri="/-msg-
/touchverse/7f033ef5f460f9aed3483d77f74f377c/" right s="rf"
/>
```

The "rights" parameter includes the letter r indicating read rights. The "rights" parameter further indicates (via the f) that the specified access rights should filter down into subcollections and other items contained within the collection. Subcollection rights are masked by the main collection's access rights; thus if the main collection's access rights specify read-only access, the subcollection cannot be given edit, insert, or delete rights. Thus, individual documents (or subcollections) within a collection are given the more restrictive of 1) a particular access level for that document or subcollection; and 2) an access level for the containing collection. Determination of an access level can be performed on-the-fly, in response to a user's attempt to access the document or subcollection, as described in more detail below.

In general, only an individual with "admin" access can change -access- file 1101. Changes are made through a server API, so that the server does not need to reveal the entire -access- file, and security is maintained. By default, new layers are given the same access permissions as previous layers.

-access- file 1101 can specify access levels for an entire collection, or for subcollections, or for individual files or regions within a collection. In general, an access level associated with a more specific DRI takes precedence over an access level associated with a less specific DRI. For example, if a "read" access level is specified for a collection DRI, and an "edit/delete" access level is specified for a DRI of an individual file within that collection, the "edit/delete" access level takes precedence, so the user can edit or delete the file. Similarly, if no access level is specified for a collection, but "read" access is specified for a region within the collection, the user can read documents within that region. However, if the "filter" attribute is set, the access level for a subcollection or individual item may be limited by the access level for the containing collection.

As discussed above, in general server 108 never reveals or transmits the entire -access- file; rather, only the <accesscontrol> element and <access> elements related to a specific collection or request are given out. For example, consider the following excerpt of an -access- file:

```
<?xml version="1.0" encoding="UTF-8"?>
<accesscontrol
identityhash="b44b689d57f0a37e7da6855feaa792bd" >
    <access dri="/-msg-
/touchverse/602270e10ae23143483c5324ad10ae26/"
```

```
        rights="aried">
               <access dri="2/TargetARep1.jpg" rights="r" />
          </access>
          <access dri="/-msg-
/touchverse/7f033ef5f460f9aed3483d77f74f377c/" rights="rx"
/>
          <access dri="/-msg-
/touchverse/a1efc714aca292a3c7407961f44d6034/" rights=" ">
               <rect rights="r" x="0" y="0" width="600"
height="200" />
               <polygon rights="i" points="200,0 350,0
350,600 200,600" />
          </access>
          <access dri="/-msg-
/touchverse/7cd0b356d7cf69f7e8f2a7ecd0f4003d/" rights="i" >
               <halfplanes rights="r" lines="0,-1,200" /> <!-
- Can append only if y >= 200 -->
          </access>
          <access dri="/-msg-
/touchverse/c9b7e5aa318b59acad4ca5e36463c2ac/" rights ="i"
>
               <overview dri="2/overview.jpg" rights="r" />
<!-- Read access to overview image -->
          </access>
     </accesscontrol>
```

When a client attempts to access the collection using a DRI such as

/-msg-/touchverse/c9b7e5aa318b59acad4ca5e36463c2ac server 108 returns the following portions of the -access- file:

```
<?xml version="1.0" encoding="UTF-8"?>
<accesscontrol
identityhash="b44b689d57f0a37e7da6855feaa792bd" >
          <access dri="/-msg-
/touchverse/c9b7e5aa318b59acad4ca5e36463c2ac/" rights ="i"
>
               <overview dri="2/overview.jpg" rights="r" />
          </access>
     </accesscontrol>
```

The client now has the identifier for the collection, as well as information specifying the particular documents 104 or other objects it is permitted to access. <access> elements for other collection identifiers are not given out, since they are not needed by the client.

Avoiding transmission of the entire -access- file improves the overall security of the system. Some systems which have multiple servers are set up so that each server knows about all the other servers. If the system is configured so that the servers "trust" one another, they can share sensitive information. However, such configurations are vulnerable to security exploits where a computer masquerades as a trusted server or a computer listens in on communications between trusted servers and captures the sensitive information exchanged between those servers.

The technique described herein avoids this problem. By configuring servers so that they minimize the exchange of sensitive information, such security exploits can be minimized or eliminated. A policy of never giving out the -access- file serves this function. Since, in one embodiment, server 108 does not give out the entire -access- file, the present invention can be securely implemented even when it is used in conjunction with untrusted servers.

Individual files, subcollections, or other elements can be given different access levels than their containing collections. In one embodiment, <access> elements in -access- file 1101 are arranged in a tree structure that maps to the directory structure of the collection, thus providing a representation of the collection hierarchy. Wildcards (*) in DRI paths indicate that a particular access level applies to a file in multiple directories. The following example of an excerpt of an -access- file 1101 illustrates these concepts:

```
          <access dri="/-msg-
/touchverse/602270e10ae23143483c5324ad10ae26/"
rights="aried">
               <access dri="*/TargetARep1.jpg" rights="r" />
          </access>
```

The above excerpt sets the rights for the directory at "aried" (specifying admin, read, insert, edit, and delete access rights), and sets the access rights for the TargetARep1.jpg file at "r" (specifying read access rights).

Some files in a collection contain the DRI of that collection 105. For instance, in one embodiment, both the TVM file (which describes all of the documents 104 in the collection 105) and the SVG file (which provides the graphical layout of the collection 105) may contain references to the DRI as well as to DRIs of other collections 105.

In general, DRIs are modified before providing the files to a client. Specifically, each TVM file contains the DRI of the collection 105 that it represents. This DRI corresponds to the DRI that was used to access the TVM file. When collection server 108 provides the TVM file to a client, the DRI contained in the TVM file is rewritten to be that of the DRI that the client already knows.

If the "f" attribute is active, and the TVM file contains a reference to a collection 105 that has more permissive access permissions than the containing collection 105, a new collection 105 is created with restricted permissions, and the TVM file is rewritten to reflect the restricted collection 105 instead of the permissive collection 105.

When a new restricted access DRI is created, -access- file 1101 includes <map> elements to map the original DRIs to the new restricted access DRIs so that the correct level of access is provided.

Figure 12:
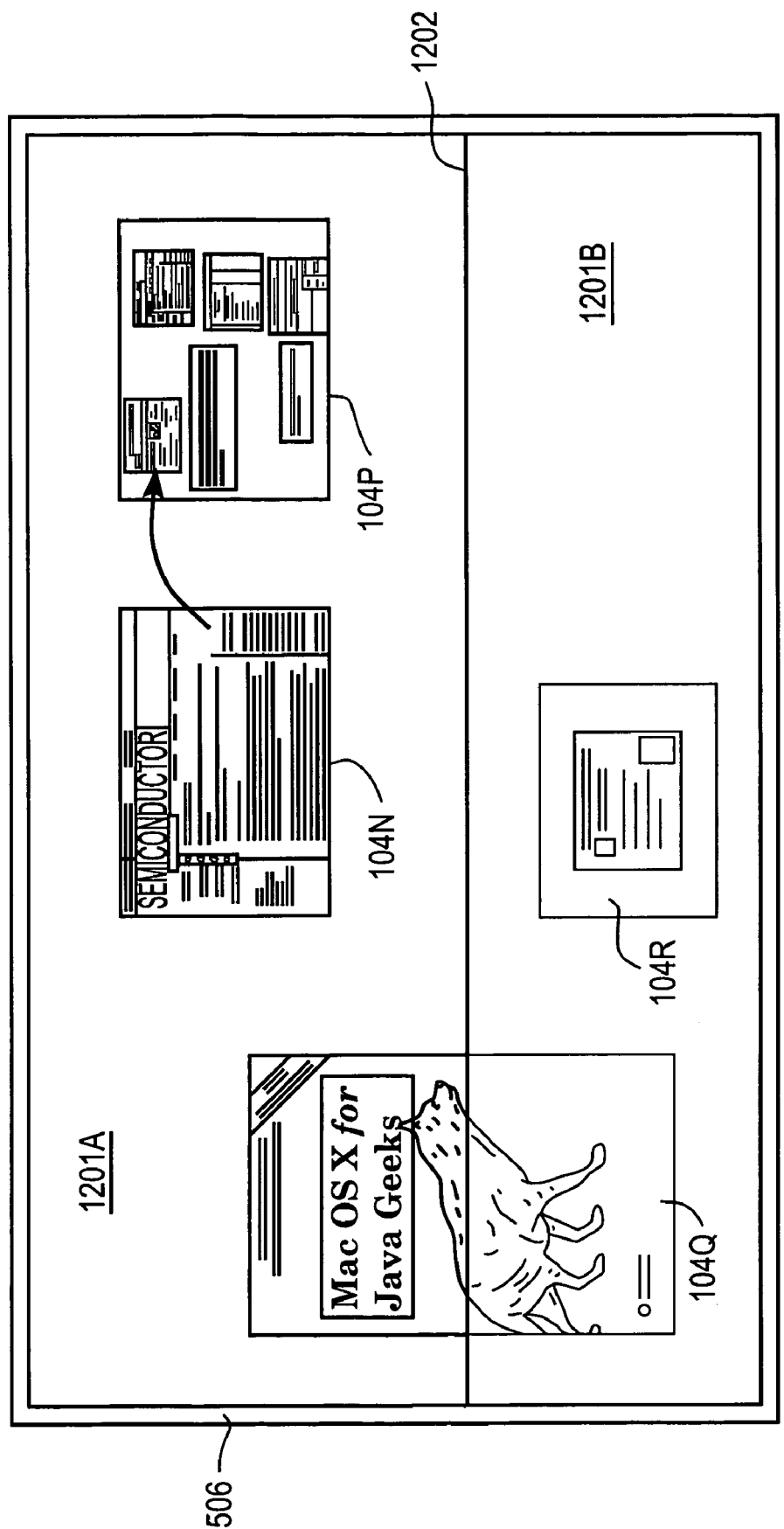
FIG. 12 depicts an example of a collection having multiple permission regions.

In one embodiment, a single collection 105 can have multiple permission regions 1201, specified for example according to region within collection overview 506. Referring now to FIG. 12, there is shown an example of a collection 105 having multiple permission regions. Collection overview 506 is divided into two permission regions 1201A, 1201B defined by reference to a horizontal line 1202 at a coordinate position of y=200. An item whose top-left corner is located in region 1201A above line 1202 carries read-only permissions, while an item whose top-left corner is located in region 1201B below line 1202 carries insert-only permissions. Thus, in the example shown, documents 104N, 104P, and 104Q would carry read-only permissions, while document 104R would not be readable since it lies within the insert-only region 1201B. (In one embodiment, document 104R would not be shown on coversheet 102, since that document 104R is not readable by the possessor of that coversheet 102.) Of course, these access limitations would apply only to a user using a DRI associated with the particular -access- file that specifies such limitations; a user using another DRI might have a different set of access permissions.

An example of an <access> element for specifying access levels as shown in the example of FIG. 12 is as follows:

```
    <access dri="/-msg-
/touchverse/a1efc714aca292a3c7407961f44d6034/" rights=" " >
        <rect rights="rf" x="0" y="0" width="600"
height="200" />
        <polygon rights="i" points="200,0 350,0 350,600
200,600" />
    </access>
```

Another example of an <access> element specifying a similar configuration of access levels is as follows:

```
    <access dri="/-msg-
/touchverse/7cd0b356d7cf69f7e8f2a7ecd0f4003d/" rights="i" >
        <halfplanes rights="r" lines="0,-1,200 " />
    </access>
```

The <halfplanes> element specifies a half-space within the two-dimensional region of the overview image, using a coordinate system wherein, for example, the (0,0) point is in the upper left corner of the overview image. Referring again to FIG. 12, the SVG file that specifies the layout of overview 506, a width and height is specified. For purposes of illustration, the width and height are 600 units and 350 units, respectively. The <halfplanes> element specifies a dividing line 1202 at y=200 using an equation Ax+By+C (in this example, A=0, B=−1, and C=200.) Any (x,y) pair which, when plugged into this equation, returns a value which is less than 0 is considered out of the halfplane. For instance, (20, 210) produces a value of −10 and is not in the halfplane specified by the <halfplanes> element, but (0, 0) returns a value of 200 and is therefore within the halfplane. Thus, it can be determined whether any particular object is within the region defined by the <halfplanes> element.

Figure 11:
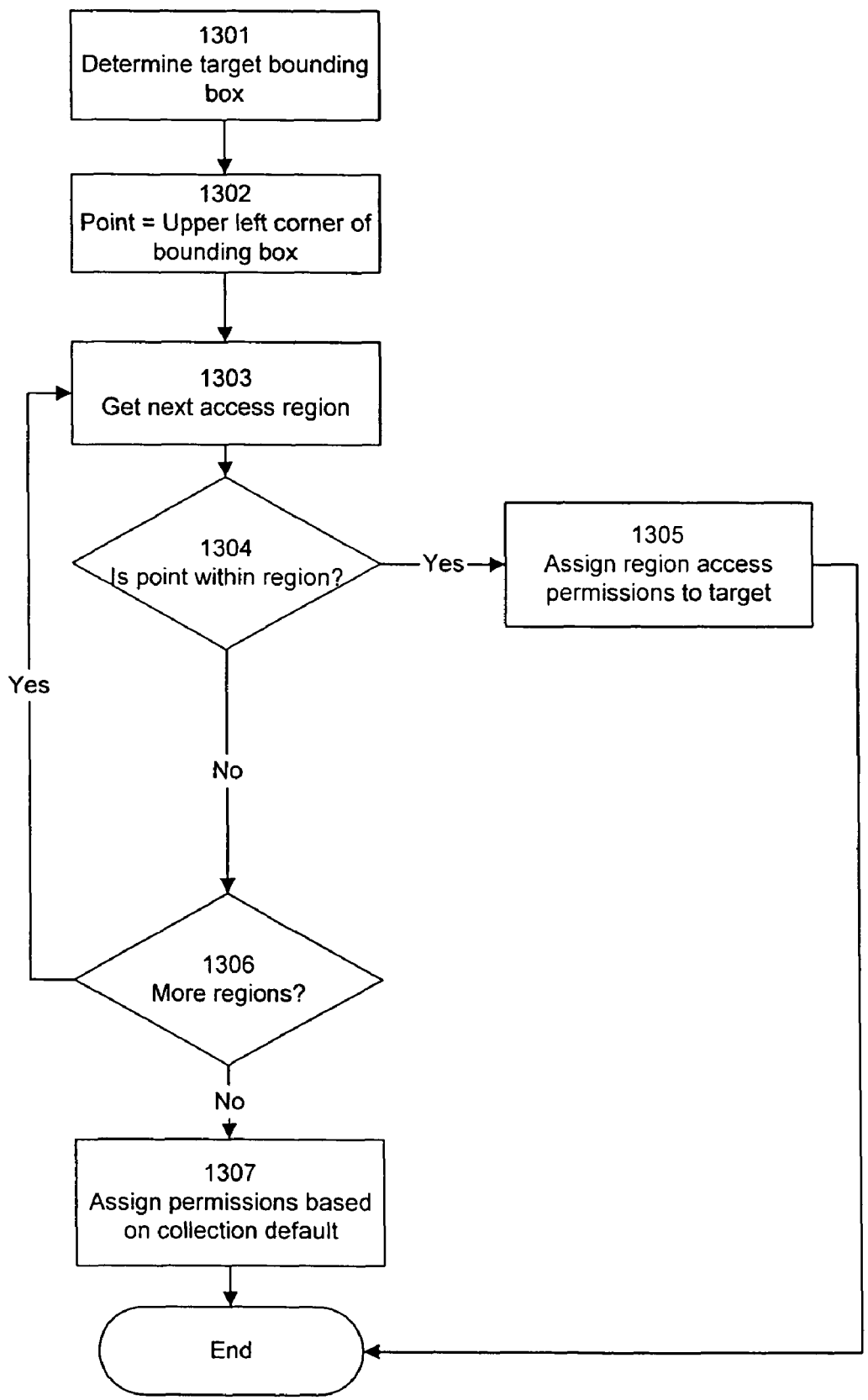
FIG. 11 is a flowchart depicting a method of determining an access level according to region.

Referring now to FIG. 11, there is shown a flowchart of a method of determining an access level according to region. The bounding box for a document 104 or other target is determined 1301; in one embodiment, this may be the smallest rectangle that completely encloses the document 104 representation in overview 506. The variable "point" is defined 1302 as the top-left corner of the bounding box.

In steps 1303 through 1306, access regions 1201 are consulted in turn, to determine which one contains point. An access region 1201 is consulted 1303, and a determination is made 1304 as to whether point lies within region 1201. If so, the defined region access permissions for region 1201 are assigned to the target. If point does not lie within region 1201, and more regions 1201 exist 1306, the next access region 1201 is consulted 1303. If point does not lie within region 1201, and no more regions 1201 exist 1306, permissions are assigned 1307 based on a default for collection 105.

As discussed above, the 'f' or "filter" access parameter prevents documents or sub-collections within a main collection from having access rights that are higher than those of the main collection. For example, if a main collection has access rights of read-only, documents or sub-collections within that collection could have full permissions only if the filter parameter were turned off, or if a higher access permission is specified for a particular document or sub-collection in the -access- file.

When the filter parameter is specified, sub-collection and document access rights are masked by the rights associated with the main (containing) collection. Thus, the access rights for the sub-collection or document would be the more restrictive of a) the access rights specified for that sub-collection or document; and b) the access rights of the main (containing) collection.

In one embodiment, a new version of the sub-collection or document is created on-the-fly when needed. Thus, for example, if a main collection specifies read-only access, and the filter parameter is specified, the system of the present invention would create a read-only version for any document or sub-collection within that main collection that does not already have a read-only version. In one embodiment, such a version is created only in response to an attempt to access the document or sub-collection. The DRI for the new version is then provided by server 108 so that a client can access it at the appropriate access level.

For example, suppose a coversheet 102 is presented that indicates read-only access for collection A. If collection A contains subcollection B, and the available DRI for subcollection B points to a collection with unrestricted access, a new read-only pointer for subcollection B is generated. Server 108 adds a <map> element to the -access- file for collection A, indicating that read-only access to subcollection B is available via the new DRI. Then, server 108 responds to the request for collection A by providing the read-only pointer to subcollection B. TVM and SVG files are rewritten as needed to point to the new DRI.

In one embodiment, a user can create a more restricted version of a collection only by copying the collection and assigning the more restricted access level to the copy. In another embodiment, the user can create a new DRI that corresponds to the original collection but is more restrictive in the access it allows.

In one embodiment, an identityhash attribute is provided as a unique collection identifier available to all clients, regardless of their access privileges and regardless of the DRI they use to access the collection. The identityhash attribute allows clients to determine if two different DRI's point to the same collection. Clients are thereby able to delete redundant DRI's, particularly when more than one DRI points to the same collection (either with the same or with different access levels). In addition, the identityhash attribute allows remote servers to build an -access- file without requiring them to have access to the entire -access- file.

When a client accesses a collection using a DRI, the client is given or can request the identityhash value of that collection from the server. If the identityhash matches that of another collection with a different DRI that the client is already aware of, then the client can determine that both DRIs point to the same collection. This is especially useful for remote servers. If several clients request collections through a remote server, the server can determine which DRIs point to the same collections. It is convenient and efficient for the server to merge all DRIs that point to a single collection. Such a technique also saves space on the server. In order to merge multiple DRIs into a single collection, the server creates a link from all DRIs to the one directory that contains the files and subdirectories in the collection, merges the -access- file entries, and creates <map> elements in the -access- file.

Figure 10A:
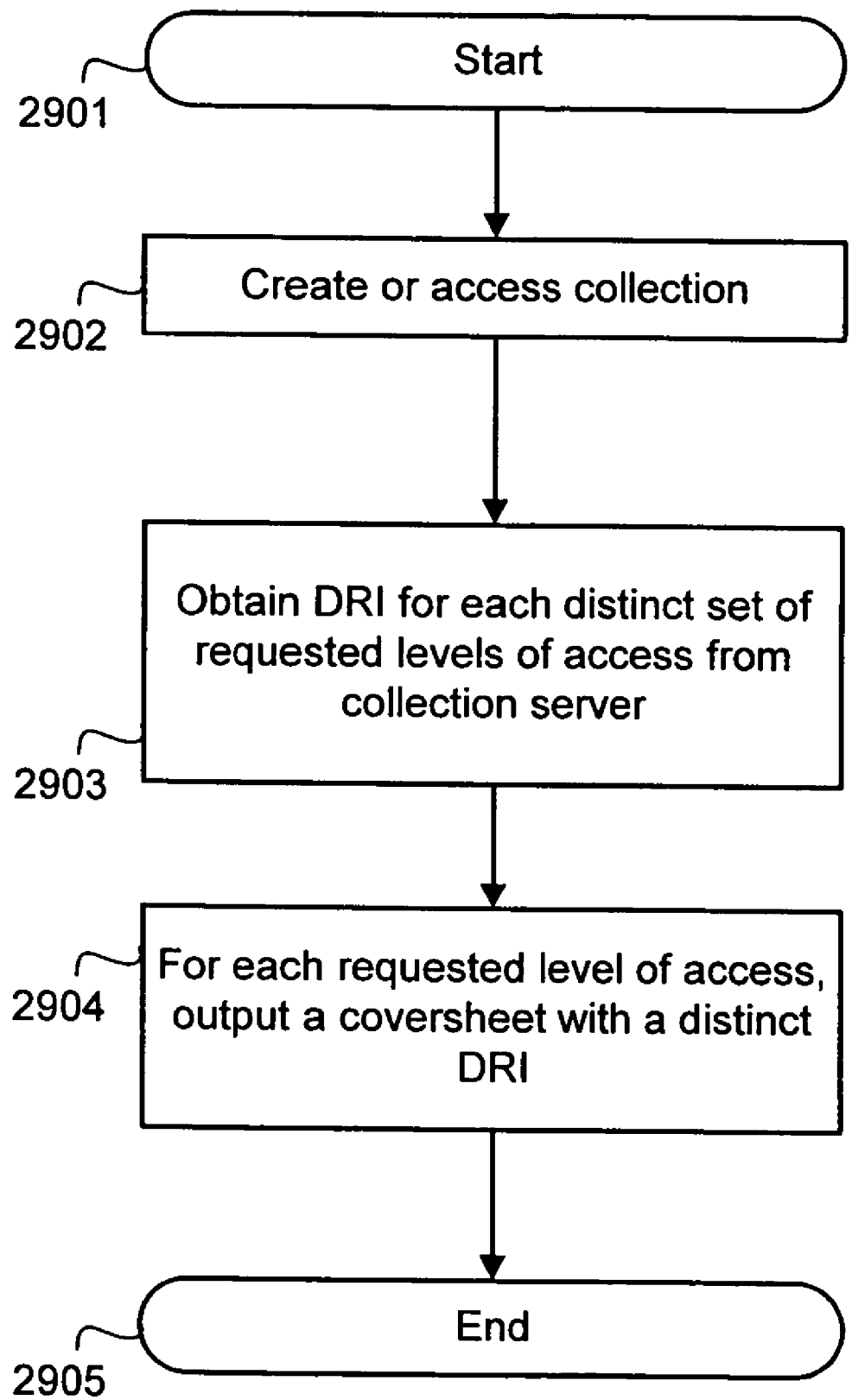
FIG. 10A is a flow chart depicting a method for creating limited access coversheets, according to one embodiment.

Referring now to FIG. 10A, there is shown a flowchart depicting a method for creating limited access coversheet according to one embodiment. The method is described in the context of granting levels of access to collections 105 of documents 104 via paper coversheets 102. One skilled in the art will recognize many variations are possible in light of this description without departing from the principles of this invention. In particular, the various steps depicted in FIG. 10A can be performed in any order, and the invention is not limited to the particular order depicted.

MFP 100 creates 2902 a new collection 105 or accesses an existing one. In response to a user's request, MFP 100 obtains 2903 a DRI corresponding to each distinct access level. For example, if the user requests a coversheet 102 that allows add-only access and a second coversheet 102 that allows read-only access, MFP 100 would obtain a DRI for each of the two access levels. In one embodiment, each DRI is obtained from collection server 108; alternatively, DRIs may be retrieved from local storage based on previously obtained data. Preferably, DRIs cannot be derived from one another. Thus, an individual who has been granted one level of access, and is therefore in possession of a DRI for that access level, cannot easily determine or guess the DRI for another access level.

In one embodiment, step 2903 includes the following substeps:

server 108 receives request for new DRI based on existing DRI;

server 108 creates new DRI and links it to existing DRI;

server 108 modifies -access- file by adding elements corresponding to new DRI with correct permissions;

server 108 provides new DRI to client.

Then, for each requested access level, MFP 100 outputs 2904 a coversheet 102 containing the DRI corresponding to the access level; alternatively, MFP 100 can email the DRI or otherwise output or transmit it without necessarily generating a coversheet 102. In one embodiment, MFP 100 is configured to generate certain types of coversheet 102 by default. For example, if an add-only coversheet 102 is requested and no other coversheet 102 is requested, MFP 100 may, by default, generate a full-access coversheet as well. This would prevent a situation wherein the add-only DRI is the only DRI output, and no DRI to a version that permits reading is known, so that nobody would have permission to read the added documents. In another embodiment, MFP 100 may prompt the user to confirm a choice that would potentially lead to such a problem. Such confirmation may be obtained, for example, by presenting an "Are you sure?" dialog box on control panel 106 or other user interface.

Figure 10B:
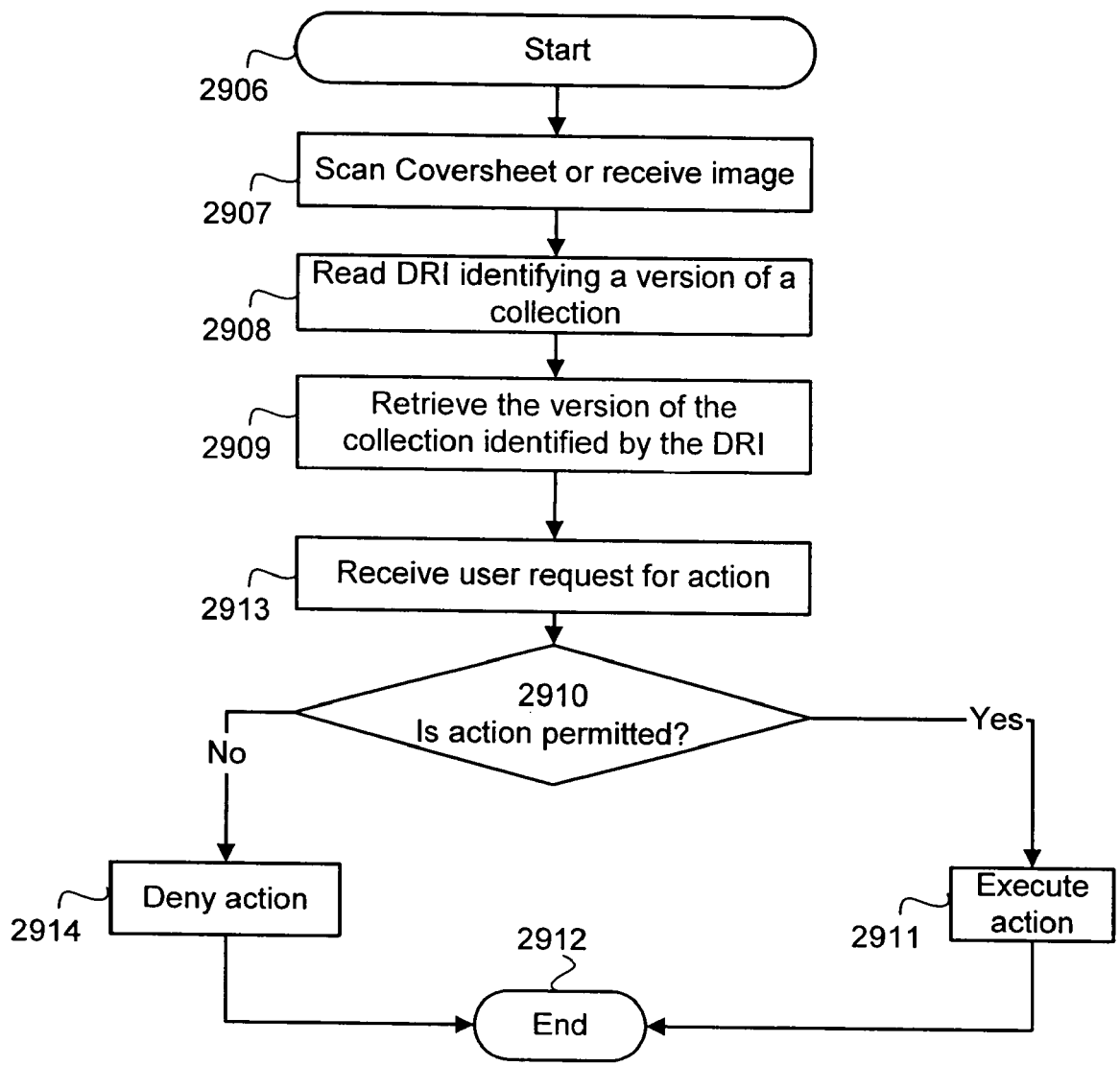
FIG. 10B is a flow chart depicting a method for using a limited access coversheet to access a collection, according to one embodiment.

Once a limited limited-access coversheet is created, it can be used to access collections. Referring now to FIG. 10B, there is shown a flowchart depicting a method for using limited-access coversheets 102 to access collections 105. One skilled in the art will recognize that the various steps depicted in FIG. 10B can be performed in a sequence other than that depicted, and that the invention is not limited to the particular order shown in the Figure.

MFP 100 scans 2907 coversheet 102 (or otherwise receives an image representing a collection) and reads 2908 the DRI. The DRI identifies a version of a collection 105 with a given level of access. MFP 100 uses the DRI to retrieve 2909 the version of the collection 105 identified by the DRI from collection server 108. In response to receiving 2913 a user's request to perform an action with respect to the collection 105, the MFP 100 determines 2910 whether the action is permitted by either: a) transmitting the request to collection server 108 so that server 108 can determine whether the action is permitted; or b) using the access metadata from collection server 108 to determine whether the action is permitted 2910; or c) performing some other operation for determining whether the action is permitted given the level of access permitted by the DRI. If the action is permitted, MFP 100 executes 2911 the action on the documents 104. If the action is not permitted, MFP 100 denies 2914 the action, and in one embodiment indicates the denial to the user via control panel 106 or other output device.

In one embodiment, allowance or denial of the action can take place at server 108 rather than (or in addition to) taking place at MFP 100. Thus, even when MFP 100 fails to block an unauthorized action from taking place, server 108 can deny the action if it is determined that the level of access specified by the DRI does not permit the requested action. For example, if MFP 100 accepts a newly scanned document 104 for addition to collection 106, and server 108 determines that the DRI presented only permits read-only access, server 108 denies the addition, and transmits a message to MFP 100 so that MFP 100 can communicate the denial to the user.

In one embodiment, the techniques described herein are combined with techniques for providing limited permission overview regions as described in related U.S. patent application Ser. No. 10/404,916 titled "Method and Apparatus for Composing Multimedia Documents," filed Mar. 31, 2003, the disclosure of which is incorporated by reference. For example, the related application provides additional description and Figures depicting collection coversheets having various permission levels. One skilled in the art will recognize that the above-described techniques can also be combined with other techniques set forth elsewhere in this disclosure and/or in related disclosures that are incorporated by reference.

Additional Functionality

In some embodiments, the present invention is able to provide access levels that change or expire upon the occurrence of some predetermined event. The following are examples of such functionality. Any of these features may be included alone or in combinations with one another and/or with other functionality described above.

Modifying Access Levels. In one embodiment, authorized persons can modify a level of access of a collection 105. Such authorized persons may include, for example, document administrators. In one embodiment, anyone who possesses a coversheet 102 that specifies "admin" access can perform such operations, including modifying access levels for others. In another embodiment, one or more specific individuals have this capability; known techniques of identity verification can be used to determine whether to grant "admin" access to an individual. When the access level of a collection 105 is modified, collection server 108 modifies the access permissions information for collection 105 accordingly, and/or assigns a distinct DRI to a version of the collection 105 that provides the specified access level.

Expiring Coversheets. In one embodiment, when a collection coversheet 102 is created, the user can specify that coversheet 102 will expire after a predetermined period of time, or after it has been used a predetermined number of times. Such a feature may be especially useful in applications where it is desirable to strictly control the number of copies of a document that are in circulation. After the expiry event takes place, server 108 denies access to the document 104 or collection 105 referenced by the coversheet 102. In another embodiment, after the expiry event takes place (or upon occurrence of some other trigger event that has been previously specified), the access level associated with coversheet 102 changes to a more (or less) restrictive access level.

For example, a DRI on a coversheet 102 can initially allow full access, but upon occurrence of an expiry event or other trigger event, the "-access-" file can be changed so that the same DRI allows only read-only access. Examples of such trigger events include: review by a supervisor; suspected security breach; submission or filing; transmission of the document to an outside entity; or a deadline for changes. In one embodiment, MFP 100 tracks each access of collection 105, and further tracks which user is accessing the document. To do so, the MFP 100 may also require that a user of a coversheet 102 identify him- or herself in some manner, for example by password, name, biometric scan, or the like, in order to use the coversheet 102 to access the collection. The initial user that created collection 105, along with possibly other users possessing coversheets that allow "admin"-level access, can specify whether such identification is required before access is granted. After the trigger event has occurred, MFP 100 may optionally notify (for example via e-mail) known possessors of coversheets 102 that their access levels have been changed or have expired.

In one embodiment, the relevant variables for the event criteria are tracked in the metadata associated with the collection 105 or stored in a log. The log can be present in MFP 100, stored in collection server 108, or stored anywhere else that is accessible to the system. Maximum reliability and security can be achieved by storing the log in server 108 rather than in MFP 100 or in some unsecured location. In addition, the relevant event criteria may be printed on the coversheet. For example, coversheets 102 may be appropriately time- and date-stamped with their expiration dates using a machine-readable format, or human-readable format, or both. These date stamps can be compared with the present time when access is attempted, to determine whether coversheet 102 has expired. If access to collection 105 through coversheet 102 has not expired, MFP 100 allows access. As another example, a coversheet may expire after a predefined number of copies have been made at MFP 100.

Identification Authentication. In one embodiment, a user presenting a coversheet 102 is required to verify his or her identity before being permitted to access the collection 105. The user that created the coversheet 102 may specify that such authentication is required with respect to a particular coversheet 102. Identity authentication can be performed by password entry, biometric scan, or other techniques that are well known in the art. In addition, such functionality may be combined with the secure decryption key techniques described in related U.S. patent application Ser. No. 10/639,282 titled "Physical Key for Accessing a Securely Stored Digital Document," filed Aug. 11, 2003, the disclosure of which is incorporated by reference.

Additional Prerequisites. In one embodiment, MFP 100 requires certain conditions to be satisfied before it outputs a collection 105 or document 104, even when coversheet 102 is presented. As discussed above, in one embodiment the user that created the coversheet 102 may specify that recipient authentication be required before collection 105 can be output or accessed. The present invention can also be combined with watermarking techniques, as described for example in the above-reference related patent applications, so that printed output of MFP 100 is traceable to a particular recipient. Alternatively, a different DRI can be used for each printed coversheet 102, so that the coversheet 102 is directly traceable without the use of watermarks.

Blocked Access. From time to time, it may be desirable to block access to a collection 105, either permanently, or temporarily (such as while updating a collection 105). In one embodiment, an administrator (i.e. a user in possession of a coversheet 102 that includes a DRI permitting admin access) can request that access to one or more collections 105 be blocked, and can specify the time period during which it will be blocked. While access is blocked, server 108 refuses to honor any coversheets 102 that have been issued for collection 105. In one embodiment, control panel 106 (or other output device) can provide an explanation of the block to the user attempting access, and can optionally provide additional information such as an estimated time when the block will be lifted.

Customized Level of Access by Document. In one embodiment, in addition to providing the ability to specify an access level for a collection 105, the invention allows a user to specify individual access levels on a document-by-document basis within the collection 105. If the user selects this option, MFP 100 presents, on control panel 106 or other display device, a list of documents 104 within the collection 105 so that the user can individually specify the level of access for each document 104. Alternatively, the user can indicate on coversheet 102 various access levels for different documents 104 within collection 105. MFP 100 can then scan coversheet 102 and send a request to server 108 to apply the indicated access restrictions. The user can also specify the "filter" option, as described above, whereby a collection's access level applied is recursively applied to subcollections within the collection.

Denying Access Beyond Level Specified. In one embodiment, alternative methods and mechanisms exist for accessing collections 105 and documents 104, so that coversheets 102 are not the only method of obtaining access. Thus, if a coversheet 102 is lost or destroyed, or if the DRI is lost or unreadable, it may still be possible to access the collection 105 associated with the coversheet 102 on an emergency basis. For example, a user may browse for a collection 105 using control panel 106, or may use conventional techniques for navigating to and selecting collections 105 and documents 104.

If security is desired, such alternative ways of gaining access to a collection 105 can be restricted to authorized administrators, system operators, and the like. In another embodiment, to maximize security, such alternative ways are eliminated, so that coversheet 102 is the only way to access a collection 105 or document 104. Additional security can be provided by combining aspects of this invention with inventions described in related U.S. patent application Ser. No. 10/639,282 titled "Physical Key for Accessing a Securely Stored Digital Document," filed Aug. 11, 2003, the disclosure of which is incorporated by reference.

The present invention has been described in connection with a specific implementation of a typical embodiment thereof. It will be understood by those skilled in the relevant art that many changes can be made without departing from the true spirit and scope of the present invention. Therefore, it is intended by the appended claims to cover all such changes and modifications that come within the true spirit and scope of this invention.

What is claimed is:

1. A method of composing a collection of information comprising:

receiving, at a multi-function peripheral, a plurality of paper documents in an order, wherein receiving the plurality of paper documents includes receiving a first paper document and receiving a subsequent paper document;

determining, by the multi-function peripheral, the order of the plurality of paper documents;

responsive to the order of the plurality of paper documents determining, by the multi-function peripheral, whether the first paper document includes an indicium identifying a collection;

responsive to determining that the first paper document includes an indicium, the multi-function peripheral adding an electronic representation of the subsequent paper document to the collection identified by the indicium; and responsive to determining that the first paper document does not include an indicium, the multi-function peripheral creating a new collection.

2. The method of claim 1, wherein creating a new collection further comprises adding an electronic representation of the subsequent paper document to the new collection.

3. The method of claim 1, further comprising:
receiving a separator prior to receiving the subsequent paper document.

4. The method of claim 3, wherein the separator comprises a piece of paper including a separator indicium.

5. The method of claim 1, further comprising:
responsive to the first paper document including an indicium identifying a first collection, and the subsequent paper document including an indicium identifying a second collection, adding a subset of the contents of the second collection to the first collection.

6. The method of claim 1, further comprising:
responsive to the first paper document including an indicium identifying a first collection, and the subsequent paper document including an indicium identifying a second collection, adding the second collection as a subcollection of the first collection.

7. The method of claim 1, wherein:
receiving a first paper document comprises scanning the first paper document; and
receiving a subsequent document comprises scanning the subsequent paper document.

8. The method of claim 1, wherein the collection comprises at least one multimedia item.

9. The method of claim 1, wherein the collection comprises at least one item selected from the group consisting of:
documents;
images;
files;
video data; and
audio data.

10. The method of claim 1, wherein adding the electronic representation of the subsequent paper document comprises:
retrieving, from a storage device, the collection;
modifying the retrieved collection to add the electronic representation of the subsequent paper document; and
storing the modified collection.

11. The method of claim 1, wherein the collection comprises a collection of multimedia documents.

12. The method of claim 1, wherein the indicium comprises a machine-readable code.

13. The method of claim 1, wherein creating the new collection further comprises adding an electronic representation of the first paper document to the new collection.

14. A computer-readable storage medium storing computer program instructions for composing a collection of information, the computer program instructions when executed by a computer processor performing steps comprising:
receiving a plurality of paper documents in an order, wherein receiving the plurality of paper documents includes receiving a first paper document and receiving a subsequent paper document;
determining the order of the plurality of paper documents;
responsive to the order of the plurality of paper documents determining whether the first paper document includes an indicium identifying a collection;
responsive to determining that the first paper document includes an indicium, adding an electronic representation of the subsequent paper document to the collection identified by the indicium; and
responsive to determining that the first paper document does not include an indicium, creating a new collection.

15. The computer-readable storage medium of claim 14, wherein creating a new collection further comprises adding an electronic representation of the subsequent paper document to the new collection.

16. The computer-readable storage medium of claim 14, wherein the computer program instructions when executed further performing steps comprising:
receiving a separator prior to receiving the subsequent paper document.

17. The computer-readable storage medium of claim 16, wherein the separator comprises a piece of paper including a separator indicium.

18. The computer-readable storage medium of claim 14, wherein the computer program instructions when executed further performing steps comprising:
responsive to the first paper document including an indicium identifying a first collection, and the subsequent paper document including an indicium identifying a second collection, adding a subset of the contents of the second collection to the first collection.

19. The computer-readable storage medium of claim 14, wherein the computer program instructions when executed further performing steps comprising:
responsive to the first paper document including an indicium identifying a first collection, and the subsequent paper document including an indicium identifying a second collection, adding the second collection as a subcollection of the first collection.

20. The computer-readable storage medium of claim 14, wherein:
receiving a first paper document comprises scanning the first paper document; and
receiving a subsequent document comprises scanning the subsequent paper document.

21. The computer-readable storage medium of claim 14, wherein the collection comprises at least one multimedia item.

22. The computer-readable storage medium of claim 14, wherein the collection comprises at least one item selected from the group consisting of:
documents;
images;
files;
video data; and
audio data.

23. The computer-readable storage medium of claim 14, wherein adding the electronic representation of the subsequent paper document comprises:
retrieving, from a storage device, the collection;
modifying the retrieved collection to add the electronic representation of the subsequent paper document; and
storing the modified collection.

24. The computer-readable storage medium of claim 14, wherein the collection comprises a collection of multimedia documents.

25. The computer-readable storage medium of claim 14, wherein the indicium comprises a machine-readable code.

26. The computer-readable storage medium of claim 14, wherein creating the new collection further comprises adding an electronic representation of the first paper document to the new collection.

* * * * *